(12) United States Patent
Cotugno et al.

(10) Patent No.: US 6,353,887 B1
(45) Date of Patent: Mar. 5, 2002

(54) DIGITAL SIGNATURING METHOD AND SYSTEM FOR RE-CREATING SPECIALIZED NATIVE FILES OUT OF A CONTAINER IMPORTED FROM AN OPEN NETWORK OR RESIDING ON A CD-ROM

(75) Inventors: Lauren Ann Cotugno, Dove Canyon; Thien Huu Pham, Garden Grove; Edward Henry Frankel, Rancho Cucamonga, all of CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/191,880

(22) Filed: Nov. 13, 1998

(51) Int. Cl.[7] ................................................ G06F 11/30
(52) U.S. Cl. ........................ 713/165; 713/166; 713/168
(58) Field of Search ................................ 713/165, 166, 713/168, 200, 201

(56) References Cited

U.S. PATENT DOCUMENTS 6,067,416 A * 5/2000 Fraser ........................ 395/712
6,079,047 A * 6/2000 Cotugno et al. ............ 714/807

* cited by examiner

Primary Examiner—Thomas R. Peeso
(74) Attorney, Agent, or Firm—Alfred W. Kozak; Mark T. Starr; Lise A. Rode

(57) ABSTRACT

A method and system is provided whereby after specialized original native format data files have been signatured and "wrapped" along with a directory into an industry standard byte stream container file for transmission over the Internet (or for use of other computer platforms), then subsequently, the container of wrapped files with its signature can be accessed by a proprietary computer platform which will then use the signature to verify the integrity of the files and will unwrap or re-create these files back into the original specialized native format for use by the proprietary computer platform.

15 Claims, 10 Drawing Sheets

THE OVERALL PROCESS OF VERIFYING AND UNWRAPPING FILES OUT OF CONTAINERS

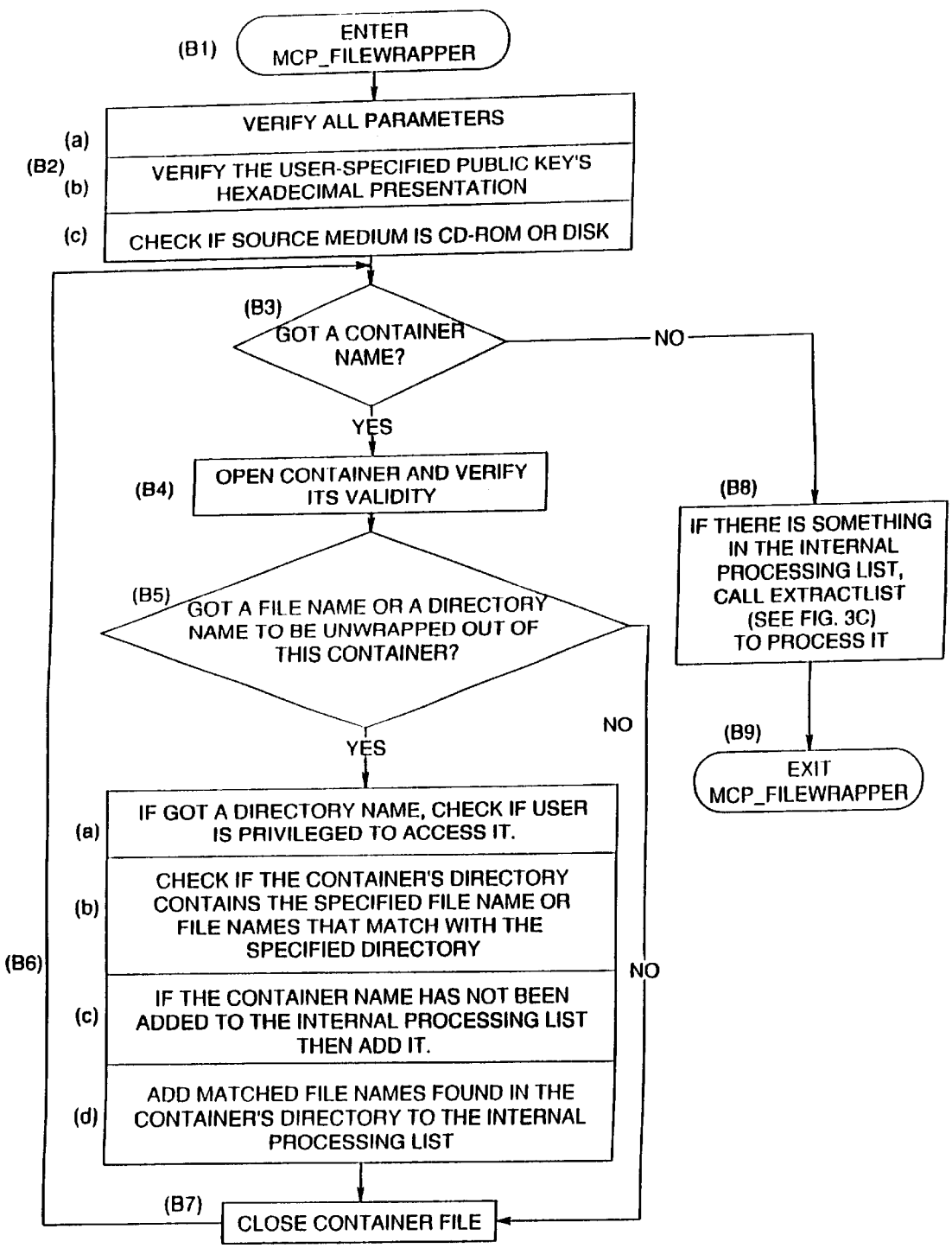
Fig. 3B  MCP_FILEWRAPPER LOGIC TO DIGITALLY VERIFY AND UNWRAP FILES OUT OF CONTAINERS

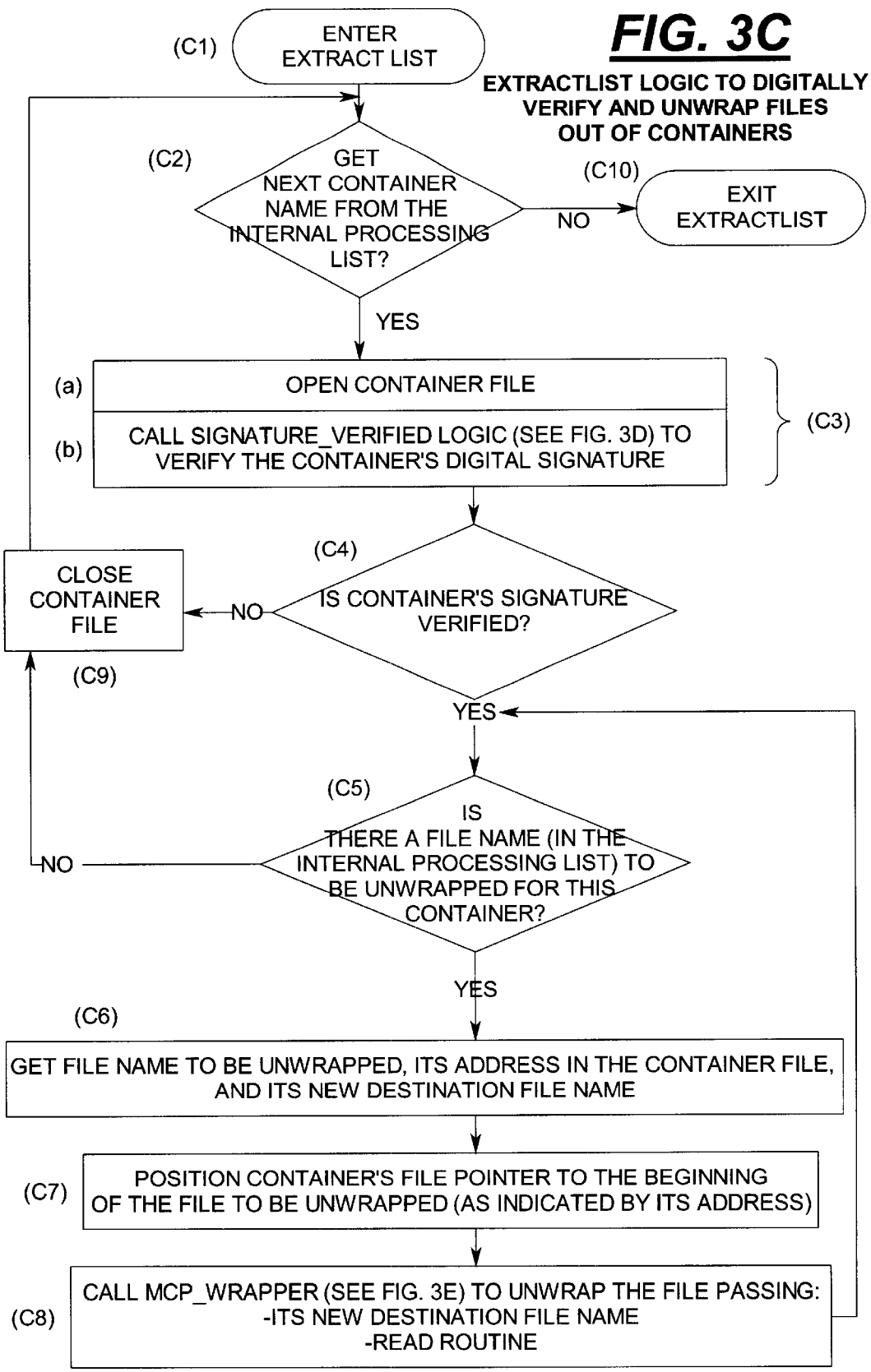

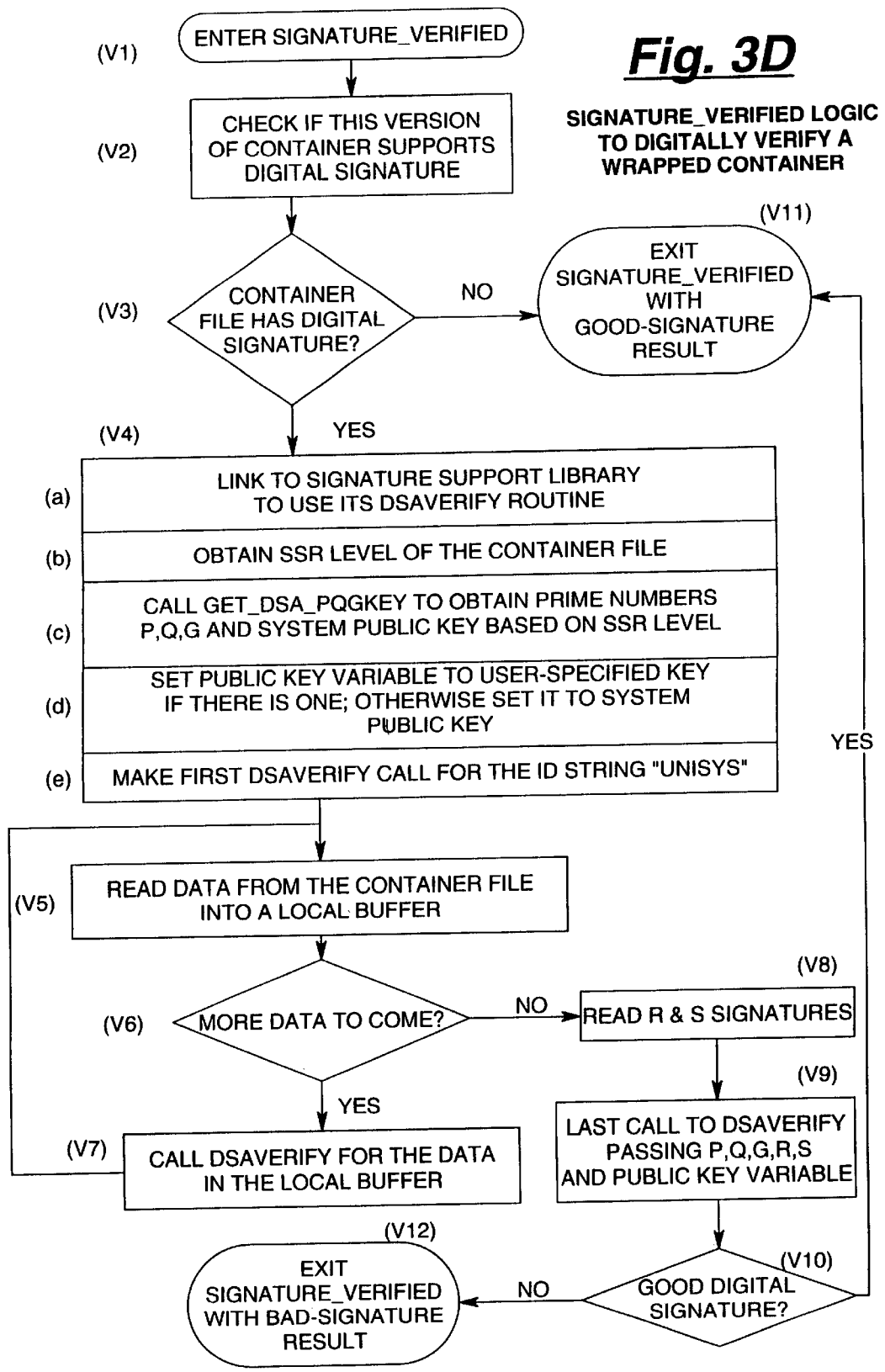

MCP_WRAPPER LOGIC
TO UNWRAP A WRAPPED FILE
OUT OF A CONTAINER

- CREATING A DSA KEYSFILE

- WRAP AND SIGNATURE A FILE

- VERIFY AND UWRAP A SIGNATURED FILE

DIGITAL SIGNATURING METHOD AND SYSTEM FOR RE-CREATING SPECIALIZED NATIVE FILES OUT OF A CONTAINER IMPORTED FROM AN OPEN NETWORK OR RESIDING ON A CD-ROM

CROSS-REFERENCES TO RELATED APPLICATIONS

This application is related to co-pending application (i) U.S. Ser. No. 09/124,557 entitled "Digital Signaturing Method and System For Packaging Specialized Files For Open Network Transport And For Burning Onto CD-ROM"; and co-pending application (ii) U.S. Ser. No. 08/989,738 issued as U.S. Pat. No. 6,085,266 entitled "System and Method for Unwrapping a Single File From a Compact Disk for Utilization by Various Computer Platforms", and co-pending application (iii) U.S. Ser. No. 09/084,040 which issued as U.S. Pat. No. 6,079,047 entitled "Unwrapping System and Method for Multiple Files of a Container", each of which are incorporated herein by reference.

FIELD OF THE INVENTION

This disclosure refers to methods of verifying and decoding (i.e., unwrapping), a signatured container file consisting of multiple wrapped files residing on a compact disc or imported from an open network by converting them from a standard text file format to native proprietary type files usable on a proprietary computer system.

BACKGROUND OF THE INVENTION

In the usage of modern computer systems and networks, the situation arises where systems having one proprietary protocol and data format are connected to systems having different data formats and protocols. Thus in order to provide for systems integration in different networks, it is necessary that there be provided a system or method whereby the data formats of a first system can be transferred to and utilized by the network of a differently oriented system.

For example, the Unisys A Series computer systems involve a Central Processing Unit and memory together with storage such as disk storage which operates under the control of a Master Control Program. These A Series systems use a particular format for the data files compatible with the A Series software which can be placed on CD-ROMs. Thus, the CD-ROMs which contain this A Series software contain an image of a formatted tape which can be utilized only by the A Series systems.

However, when it is desirable to integrate a first system such as the A Series systems for operation with other platforms such as an NT system, then problems arise in that the second system such as the NT system, utilizes formats which are not compatible with the software formats of the A Series system, which is the first system.

Presently, the software for a first system, such as an A Series system with software, is utilized by providing methods to burn CD disks from a Library Maintenance formatted tape. This method has the limitation in that it limits the type of files that are burned into CD-ROMs to those of the native A Series files.

Now, in order to provide for system integration where an A Series system is to be coupled to an NT system, which overall system would be designated as a Unisys ClearPath system, the desirability here would be to make and use a single CD-ROM disk which would carry both the A Series software and at the same time carry the NT software.

Thus in this regard, a method is needed to couple the A Series files with their native attributes and then arrange them in a format capable of being stored on a particular media such as a CD-ROM which will also hold the readable software for the NT system.

The same system or method also provides the ability to package files of a proprietary system in such a way that allows the files to be transported across an open (non-proprietary) network without losing their original characteristics. When such files return to their native environment, their true data formats can be restored by invoking an UNWRAP procedure.

For example, the A Series systems have files with specialized attributes such as FILEXIND, CREATIONDATE, RELEASEID, etc. When these files are transferred to a PC running Windows NT, all those attributes will be lost. By packaging the files and their attributes into standard, simple text files, the new files then can be transported across any open system (e.g., UNIX, NT). Upon reaching their destinations (which are other A Series systems), the text files are converted (UNWRAPPED) back to their native formats with all the proper attributes. This is ideal for maintaining A Series data formats in a heterogeneous networking environment.

A digital signature is calculated for every file as it is being WRAPPED (packaged). This signature is calculated using the Disk File Header (DFH) and the data within the file, along with the Public/Private key pair. This will ensure that there is no intentional corruption of the Disk File Header (DFH) and the data as the file is shipped across a network. It will also provide the receiver of the file a certain measure of confidence as to the origin of the file. Additionally added to the signature, there will be calculated a checksum for entire contents of the file, including the Disk File Header.

When a file is "wrapped" with a request for digital signature, its Disk File Header will have a checksum, its entire file will also have another checksum, and a digital signature will be calculated for the entire contents of the newly wrapped file. The functionality of wrapping files with digital signature is available through the WFL (Work Flow Language) syntax as well as through a programmatic interface.

As a result, the Unisys A Series systems will provide a programmatic interface to its Master Control Program (MCP) which will provide a mechanism for wrapping files with signature and for "unwrapping" signatured wrapped files.

When a wrapped file is unwrapped, the Unisys A-Series computer determines if a digital signature is present within the file. If so, it will attempt to authenticate the signature to ensure that the data has not been altered. Once the verification process completes successfully, the system permits the file to be re-created into its native form. The Work Flow Language (WFL) syntax will also be provided for this functionality.

"Wrapping" is a term which is used to define the process of packaging an A Series file, along with its Disk File Header information and a checksum and optionally a digital signature, as a byte-stream data file, so that it can be transported across heterogeneous networks and non-A Series specific media, while still maintaining its native A Series attributes.

"Unwrapping" is a term used to define the process of taking a previously "wrapped file" and coupling it with the information from its original Disk File Header (DFH) in order to restore the original native A Series file, as it existed prior to being wrapped.

Thus, the problem of a software and file format which is oriented to one specialized system can now be transformed in order to provide a format that is utilizable not just for a first system, but also for a first and second system, whereby the second system would not ordinarily be compatible with the first system. Thus, it is desirable to allow files (created on a Unisys ClearPath HKP/NX system or A-Series system) to be transformed so they can transport across a completely different system (such as NT) without loss of the file's original native characteristics.

The present disclosure involves signature verification with the "Unwrap" operation of a container of multiple files and directories, whereby there are provided methods giving the ability to restore container files that were previously "signatured" and wrapped into text stream data files, and which were transported across an open network or were burned onto industry-standard Compact Disks for distribution.

This method and system for example, provides a Unisys A-Series computer User a measure of confidence when restoring a container of wrapped files from a Compact Disk or from other communication means (for example, MS Mail, Internet, etc.). If the container file's signature is verified, then the file data is guaranteed from corruption.

SUMMARY OF INVENTION

A first platform having a specialized proprietary native format for a container of multiple files and/or directories of files of a first platform having a specialized proprietary native format can be put into a single simple byte stream container file usable by a second platform or placed onto an industry standard CD-ROM.

Now, when this byte stream container file is used to communicate with the first platform, the file must be verified through a signature which was attached to it before any of its internal wrapped files can be "unwrapped" or re-created back to the proprietary native first format.

Thus, when original specialized and formatted native proprietary container files have been signatured and converted to a byte stream industry-standard data file of a container to be burned on a Compact Disk or transported across an open network, it is often necessary to recapture the original files within the container for use by the proprietary system which has often been integrated with another system, and which may involve a Microsoft Windows NT, a UNIX or other platform in a network integrated with an A-Series system.

The present method and network allows a typical integrated system network, such as a Unisys A-Series and Microsoft NT system, to utilize the byte stream container data files from a Compact Disk (or from the network) and programmatically transform the byte stream data files within the container, after verifying their digital signatures, into their originally specified format and native attributes, usable by the A-Series platform.

The Work Flow Language of a Unisys A Series system utilizes an UNWRAP command allowing the A Series Master Control Program to verify the container's signature with its MCP_FILEWRAPPER routine which then calls an MCP_WRAPPER routine to reconstitute (unwrap) the container's signature and unwraps the container of the original native files existing within the container for use by the original proprietary system and its specialized and formatted native files.

The present method of verifying the container signature and unwrapping the container's files provides security and data integrity to ensure that none of the container's files are tampered with or altered during transit.

BRIEF DESCRIPTION OF THE DRAWINGS

FIG. 3B is a flow chart illustrating the NCP_FILEWRAPPER LOGIC to digitally verify and unwrap files out of containers;

FIG. 3C is a flow chart illustrating the EXTRACTLIST logic to digitally verify and unwrap files out of containers;

FIG. 3D is a flow chart illustrating the steps involved for the Signature_Verified Logic used to verify a container file;

GLOSSARY ITEMS

Figure 1A:
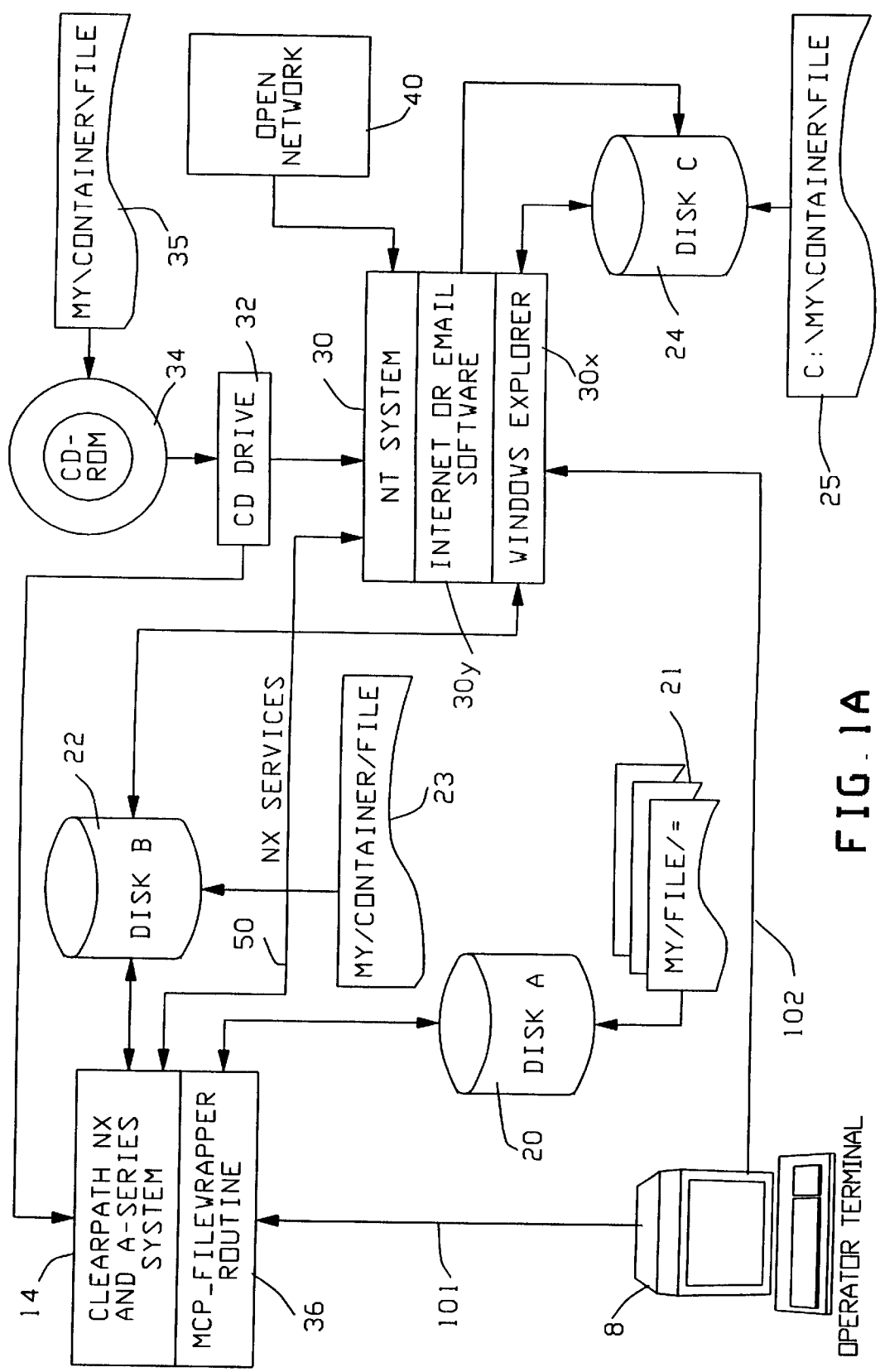
FIG. 1A is a drawing of a system whereby a container of wrapped files with signature are fed to a first platform (ClearPath) where the container is unwrapped into native proprietary usable files by the first system, and verified by the accompanying signature.

1. A SERIES ATTRIBUTES: Native attributes that can be assigned to a file to allow the system to control how the file is accessed and used, and by whom (security privileges). There are somewhere on the order of 450 such attributes for Unisys A Series files.
2. A SERIES KEYS FILE: A native file, located on a individual system, that contains license key information used to control which features an individual system is allowed to use for some features. License keys need to be purchased by the user before the feature can be utilized on the individual system.
3. ATTRIBUTE INFORMATION OF A SERIES FILES: Specific attributes assigned to individual files stored in the file's Disk File Header (DFH) on Disk.
4. BYTE-STREAM FILE: A character oriented file with FILESTRUCTURE=STRAAM, MAXRECSIZE=, AND FRAMESIZE=8. This is a simple, non-executable, data file that can exist on any kind of system.
5. DATA CD-ROM: See ISO 9660 Format (Item 12 below). These CD's appear like disks on A Series systems. Multiple user access is allowed to these CDs.
6. DIGITAL SIGNATURE: A digital signature is a hash pattern created by applying an industry standard signaturing algorithm (similar to a checksum) to a file or data stream, along with a private key. This hash pattern travels with the file across a network and is used, along with a public key, in order to ensure the file has not been compromised (intentionally or otherwise) during the transfer process.
7. CONTAINER: A single byte-stream file consisting of one or more wrapped files, a simple directory of files stored in the container, and optionally a digital signature.

8. CREATIONDATE: An A Series (Unisys) file attribute, used to store the data and time a file was created.
9. FILEDATA—LFILE: An A Series (Unisys) program, or utility, used to interrogate attribute information of native A Series files.
10. FILEKIND: An A Series (Unisys) file attribute, used to identify the internal structure of the file being accessed (e.g. Algol symbol, Algol object code, character data, or system directory).
11. INTERIM CORRECTION PROCESS (ICP): The process used by Unisys computer systems to deliver software updates to released products held by customers.
12. ISO 9660 FORMAT (A.K.A. ISO STANDARD FORMAT. HIGH SIERRA FORMAT): A standard format used for directories and files on CD-ROM disks. The presentation for the information contained on these directories is at the operating system's discretion. On Unisys A Series systems, directories and files are viewed using the standard Cande "FILES" and ODT "PD" commands.
13. LIBRARY MAINTENANCE FORMAT: A Unisys proprietary format for tapes containing multiple files used primarily for archives, backup of restore, and transferring of files among A Series systems.
14. LIRMAINT CD-ROM: A specially formatted CD-ROM, created on an ISO 9660 Formatted CD-ROM, that contains an image of a Library Maintenance tape. This appears to an A Series system as if it were a Library maintenance tape. Only one user is permitted access at a time, and only COPY (and COPY-related) syntax, and Filedata TDIR are allowed to act on this CD.
15. NATIVE A SERIES FILES: A file created on Unisys A Series systems or ClearPath HMP/NX systems specifically for use on that same class of systems.
16. NON A SERIES FILES: Files that were created on systems other than Unisys A Series or ClearPath HMP/NX systems.
17. NEW FORMAT FILE: the Byte-Stream data file that results from executing the WRAP process on an A Series file.
18. NT SOFTWARE—CD BURN PROCESS: Any standard "Off-the-shelf" package capable of burning images on to a Compact Disk (CD) that runs on a Microsoft NT system.
19. P, O, G: Primary numbers, stored in the system's digital signature keys file and used in the creation of public/private keys as well as both signing files and verifying the signatures of files, using the public and private keys.
20. PUBLIC & PRIVATE KEYS: Public and private key pairs are generated at the same time by a special utility. These key pairs are used to create a signature and then later check that signature to ensure that a file has not been compromised. These keys are generated together and must be used together to ensure the integrity of a file. Under normal operations, the private key is intended to be known only by the person or utility generating the hashed signature of the file. This key is meant to be restricted. The public key can be made available to any person or utility wishing to check the signature to ensure the integrity of the file once it has reached its destination.
21. PUBLIC/PRIVATE ENCRYPTION: A common methodology for encrypting files so they may be transported across an open network so as to use a public/private password encryption scheme. Typically, the two passwords are programmatically generated at the same time such that they can be used in conjunction with each other. One password, the private one, will be used to encrypt the file. The other password, the public one, is used by the recipient of the file to decode it. Typically, a smear pattern, or some clear text string, is added at the beginning of the file before the file is encrypted. When the file has been decoded using the public password, this smear pattern should match what was originally placed in the file. If the string does not match, it can be assumed that the integrity of the file has been compromised.
22. RELEASE ID: A Unisys A Series file attribute, used to store the specific release level that the software was created for.
23. SHARE: A Directory or disk that is made available to selected or all users across a network.
24. UNWRAP: The process of taking a previously wrapped file (or data stream) and coupling it with the information from its original Disk File Header, to re-create the original native A Series file as it existed prior to being wrapped.
25. WFL SYNTAX: Work flow language syntax, used to control job flow on a system.
26. WFL UNWRAP syntax: Specific work flow language syntax used to execute the unwrap process on a file, or files.
27. WRAP: The process of packaging an A Series file, along with its Disk File Header information and a digital signature, as a data stream, or as a byte-stream data file (FILESTRUCTURE=STREAN, MAXRECSIZE=1, FRAMESIZE-8), so that it can be transported across heterogeneous networks and non-A Series specific media, while still maintaining its native A Series attributes.
28. INPUT FILE: The already existing file that is to be packaged into a byte-stream text file by the wrap process.
29. OUTPUT FILE: The resultant byte-stream text file created by "wrapping" the input file.
30. DSA: Digital Signature Algorithm—used to create a digital signature for a file or data stream. It should not be confused with any data encryption algorithm since the data is not encrypted by any means.
31. DSA INFORMATION SET: This term is used loosely here. It is essentially the same as DSA Key Set, but without the system DSA public key.
32. DSA KEY SET: A set of DSA information which consists of {KeyID, SSR level, Prime P, Prime Q,G, system DSA public key} for a particular software level. Only one set is created for a software release.
33. DSA KEYSFILE: The system file that contains one or more DSA key sets. If the file is titled as *SYSTEM/DSAKEYSFILE and is stored on the halt/load pack, it is considered as the active system DSA keysfile.
34. SIGNATURING: The process of applying the Digital Signature Algorithm to a file while wrapping it into a WRAPPEDDATA or CONTAINERDATA file. The resulting file is said to be digitally "signatured" or "Rsigned".
35. SYSTEM DSA PRIVATE KEY: A DSA private key created for the sole purpose of signaturing Unisys-released software. It is kept secret by the Unisys Software Releases (and/or Support Group). Only one system private key exists per release. Its counterpart—the system public key—is stored in the system DSA keysfile.
36. SYSTEM DSA PUBLIC KEY: A DSA public key created for the sole purpose of verifying wrapped software signed by the Unisys Software Releases (and/or Support Group) using a corresponding system DSA private key. Only one system public key exists per release and is stored as part of a DSA key set in the system DSA keysfile.
37. VERIFYING: The process of validating the digital signature of a WRAPPEDDATA or CONTAINERDATA file before unwrapping it.
38. WRAPPED FILES: Files created as a result of the wrapping process—See Wrapping.

39. SL (SYSTEM LIBRARY): SL is a Unisys A-Series MCP systems operation used to declare that a codefile or program, is to be considered a "System Library" for execution purposes. It allows for other programs to access the functions in that library without knowing much of anything about the library itself. The operating system will have knowledge about where the library is located on the disk, and control over which programs are allowed to link to the library for the purpose of accessing its routines.

40. SIGNATURE SUPPORT LIBRARY: The Signature Support Library is the System Library function that exports routines that are used for signing and verifying files. When the NCP signs a container or a wrapped file, it makes a call to the SSL's procedure called DSASIGN. Similarly, when the NCP needs to verify a signed container or a signed wrapped file, it makes a call on the procedure DSAVERIFY. Both routines return a result that indicates if the operations were successful or not.

41. MASTER CONTROL PROGRAM (MCP): This is the Operating System (OS) of the Unisys Corporation A-Series and ClearPath platforms.

GENERAL OVERVIEW

A general overview of the system for receiving container files of industry-standard byte stream text data files with their signatures and re-constituting the files within these container files into verified data files which hold all the specialized attributes for a proprietary first system (14) is shown in FIG. 1A.

An operator terminal 8 can initiate via Channel 101, the ClearPath and A-Series system 14 to access a container file MY\CONTAINER\FILE\CD 35 which resides on the Compact Disk 34 and utilizing a Compact Disk Drive 32 and pass the container file to the MCP_FILEWRAPPER Routine 36 which will convert the container file 35 into a specialized proprietary original native set of files for placement on Disk A,20, which will now hold the unwrapped container native files 21 KY/FILE/=.

The first platform designated as the ClearPath A-Series system 14 holds the MCP_FILEWRAPPER Routine 36 which provides the process for unwrapping a container file, and also passing through the signatured data for verification.

Figure 1B:
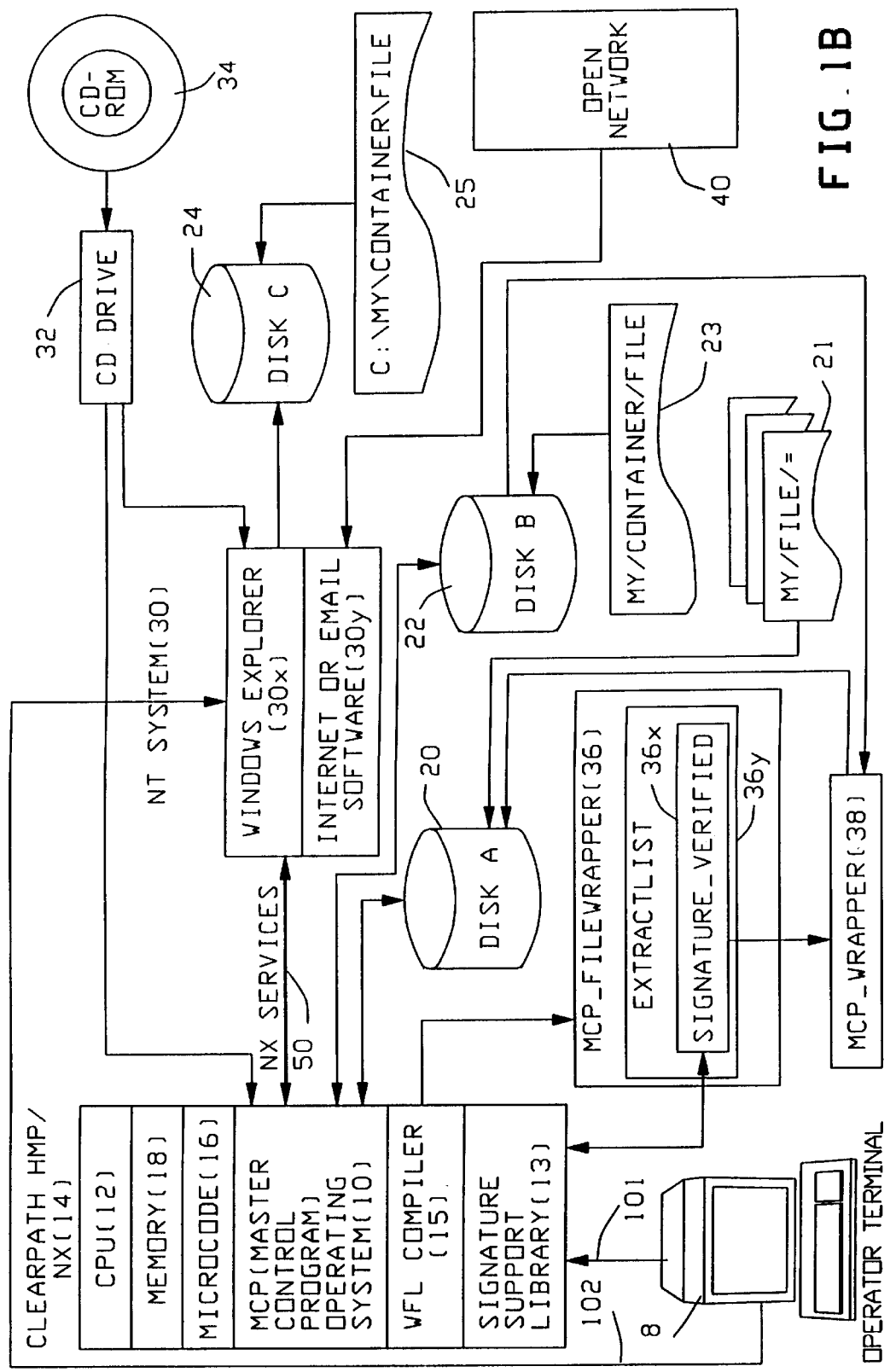
FIG. 1B is a more detailed view of the system for the unwrapping and verifying of a container of wrapped files.

Referring to FIG. 1B, the first platform 14 is connected through the NX services 50 to a second platform 30, which here is designated as the Microsoft NT system. The second platform 30 has provision for Internet or e-mail software, (30y) and also a program designated Windows Explorer, 30x.

The second platform NT system 30, could also be designated alternatively as a UNIX system, in which case the NX services 50 shown in FIG. 1B would not be required, and the Microsoft Explorer program 30x would be replaced by the industry-wide standard File Transfer Protocol (FTP).

Further in regard to FIGS. 1A, 1B container files of an industry-standard byte stream data format may be sourced from the open network 40 or from another source such as from CD-ROM 34 holding MY\CONTAINER\FILE, 35.

The byte stream text data file from the open network 40 in FIG. 1A would be passed through the second platform NT system 30 and dragged and dropped by the Windows Explorer 30x onto the Disk 24 (DISK C) as C:\MY\CONTAINER\FILE 25. This container consisting of imultiple wrapped files would then be passed over to the MCP_FILEWRAPPER Routine 36, which would then process it and unwrap these files (after verifying the container's signature) and place the resultant files onto Disk 20 (Disk A) as MY/FILE/=, 21.

Likewise, any other source of container file, such as MY/CONTAINER/FILE 23 on Disk B,22 can also be verified and unwrapped, and the resultant files could reside on any pack volume. In FIG. 1A, the resultant files MY/FILE/=, 21, are put on Disk A, 20.

The operation of the second platform 30, in FIG. 1B which receives the container file from the open network 40, would be initiated over line Channel 102 via the operator terminal 8.

FIG. 1B will describe the two operating systems and modules in greater detail to illustrate the verification and unwrapping of a container having multiple wrapped files.

DESCRIPTION OF PREFERRED EMBODIMENT

Referring to FIG. 1B, there is seen a diagram of the major elements involved for verifying and unwrapping wrapped files out of a container.

A first platform designated ClearPath HMP/NX 14 represents a Unisys A-Series computer 14 with Operating System 10, which has a Central Processing Unit 12, a Main Memory 18, a Microcode Memory 16, which is managed by the Operating System MCP 10 (Master Control Program). The CPU 12 is also supported by a storage media 20, Disk A,20 (MY/FILE/=,21) which carries the resultant unwrapped files after the conclusion of the unwrapping operation. These unwrapped files on Disk A,20, are now suitable for use and operation by the first platform 14 even though the originally received data was data which came from various sources, such as an Open Network 40, or a CD-ROM 34. The data files on Disk A,20, under the present system, have been "verified" as a result of the signaturing operation which was concurrently used to validate or verify the data files.

The first platform 14 is also seen to have a Work Flow Language compiler 15 (WFL), and a Signature Support Library 13.

Now in the sense of integrating to other platforms, there is seen a second system called the NT System 30 (which alternatively could be a UNIX, an IBM, or other system), which is a platform developed by the Microsoft Corporation, of Redland, Washington. The NT System 30 (second platform) is seen having a storage medium 24 (DISK C), which can receive a "container" file from a network 40, as designated by the file 25 C:\MY\CONTAINER\FILE.

The DISK C,24, of FIG. 1B which can hold the container file, is seen connected to the Windows Explorer 30x, and also to the MCP 10. The NX services function 50 works for the inter-cooperation between the first platform Master Control Program and the second platform Windows Explorer 30x.

In FIG. 1B, the WFL compiler 15 is seen connected to the MCP_FILEWRAPPER program 36 program by transmitting a wrapped container file which may be sourced from either a Compact Disk CD 34 NY\CONTAINER\FILE, or from the Open Network File 35 C:\MY\CONTAINER\FILE.

The MCP_FILEWRAPPER Routine 36 is seen to have a routine 36x which is designated EXTRACTLIST and another routine designated Signature_Verified 36y. The routine 36y can utilize a connection to the Signature Support Library 13 by calling the DSAVERIFY Routine (Digital Signature Algorithm Verify). The MCP_FILEWRAPPER routine 36 calls SIGNATURE_VERIFIED routine 36y to verify the digital signature of the entire container before calling MCP_WRAPPER 38 to unwrap files out of the container for placement on Disk A,20.

Thus, the A-Series ClearPath System 14 is provided with a Work Flow Language (WFL) Compiler 15, which is an interpretative language capable of taking User instructions and translating them into Operating System (OS) procedure calls. The MCP 10 has a relationship to the NT System 30 through use of a NX Services Unit 50.

NX Services 50 is a software unit used to integrate MCP operations with the NT Platform operations through use of a Microsoft (MS) Standard RPC (Remote Procedure Call) interface. The WFL Compiler 15 is an interpretative compiler which provides a new language syntax using the word WRAP or UNWRAP.

The Operator Terminal 8 of FIG. 1B, is the operator interface in which an operator would enter a command which would unwrap a wrapped file out of a container, such as the container file on Compact Disk 34, which holds the NY\CONTAINER\FILE 35. This container file on Compact Disk 34 can be accessed by the Compact Disk drive 32 and fed through the Master Control Program which utilizes the MCP_FILEWRAPPER Routine 36, the EXTRACTLIST 36x, the SIGNATURE_VERIFIED program 36y, and the MCP_WRAPPER Routine 38, in order to put the unwrapped file data on to Disk 20 (DISK A,20), where it would reside as the item 21 MY\FILE\=.

The present discussion indicated how wrapped files in a container on a Compact Disk 34 were verified and then unwrapped in order to be placed on the Disk A,20 to provide a resultant files 21, MY/FILE/=.

Another facility of the present verification and unwrap system involves the use of the second platform, which is the NT System 30. A wrapped container file can be sourced from an Open Network 40, or from another file source Disk B,22 as MY/CONTAINER/FILE(23) or from the CD-ROM. The Open Network 40 can transmit the container file to the second platform 30 via its Internet or e-mail software 30y, which will use the Windows Explorer 30x to put the container file onto Disk 24 (DISK C), the file being designated as C:NY\CONTAINER\FILE, 25.

Then as a result of the User-operator 8 commanding through Channel 102 to the second platform 30, the container file data from DISK C,24, will be passed on to the MCP 10 which will use the WFL Compiler 15 to send the container file to the MCP_FILEWRAPPER Routine 36, which will then verify the signature of the container file through use of EXTRACTLIST 36x and the routine SIGNATURE_VERIFIED 36y before utilizing the MCP_WRAPPER Routine 38 in order to unwrap multiple files out of the container, after which the unwrapped files, (whether from the CD or from the Internet), will be placed on Disk A,20 as NY/FILE/=.

Thus, what has been accomplished is to take multiple wrapped files out of a signatured container file from either industry-standard CD-RON 34, or from an open network 40, and restore them back to their original native A Series files from the container after verifying the container's embedded signature.

Accordingly, the present system operates such that operators using the first platform (A-Series systems), can unwrap their files directly from an industry-compatible Compact Disk, or from a byte stream of data over the Internet, so that the file is now usable, by merely giving it the command to UNWRAP the files.

The "digital signature, is created using an industry-standard public key/private key signaturing algorithm which provides a measure of security in that it allows a user confidence as to where the file originated from. The present system encompasses the Master Control Program (MCP), the Work Flow Language (WFL) program, and the FILE-DATA work necessary to wrap files by packaging them into new, byte-stream files (wrapping) and later restoring them (unwrap) to their original native A Series format when needed for A Series systems (Unwrapping).

NEW WFL SYNTAX:

This involves a new Work Flow Language syntax, so that arrangements are made in the WFL compiler 15 to support the new syntax which will have some similarity to a previous Library Maintenance MOVE command. The new syntax allows a User to wrap either a single file, a list of files, or a directory of files, in addition to subsequently enabling the unwrapping of these files, by specifying both the input file and the output file, or the directory title and location.

FIRST PROGRAMMATIC INTERFACE:

A first programmatic interface 36 (MCP_FILEWRAPPER) works with a second programmatic interface 38 (MCP_WRAPPER) to execute the wrap and unwrap operations. A programmatic interface for the wrap operation is provided that will allow the User-Caller to pass a native A Series file's title and location as "input" along with an "output" file, title and location. The "output" file will be a "byte-stream" file with a beginning data block containing (i) an identification string; (ii) the original files Disk File Header information; (iii) the file itself as byte-stream data; and (iv) an ending block containing a checksum, and optionally a digital signature.

Then, this added programmatic interface allows the caller to pass the byte-stream file's title and location as input, along with an output file title and location if needed, for use of the "unwrapping" process. The "resultant file" will be a native A Series file created with the output file and location, but also containing the data and all of the native A Series attributes of the original file.

SECOND PROGRAMMATIC INTERFACE:

This interface (MCP_WRAPPER) is created to allow a caller to pass the A Series file's title and location as "input", together with an "output" procedure. The data returned to the caller's output procedure will be a stream of data with (i) a beginning data block containing an identification string; (ii) the original file's Disk File Header information; (iii) the file itself as byte-stream data; and (iv) an ending block containing a checksum or a digital signature.

Functionally, the second programmatic interface (MCP_WRAPPER) will also allow the caller to pass an input procedure, along with the title and location of an output file. The data passed to the input procedure here would consist of a stream of data, with a beginning data block containing the identification string, the original file's Disk File Header (DFH) information, the file itself as "abyte-stream data", and also an ending block containing the checksum or the digital signature, which is basically the same information that was passed to the output procedure when the file was originally wrapped. Here, the "resultant file" will be a native A Series file created with the output file title and location, but containing the data and all of the native A Series attributes of the original file.

NEW FILEDATA SYNTAX:

New syntax has been added to the FILEDATA LFILEs command in order to specify that the file being interrogated is a WRAPPED DATA file. If this is a WRAPPED DATA file, then FILEDATA will report the "attributes" of the native A Series file contained within the wrapped data file, rather than the attributes of the "wrapped" data file itself.

WFL WRAP COMMAND:

This is the Work Flow Language wrap command usable in a first system platform (such as the Unisys A Series computer system) which can be executed to initiate the action of taking specialized formatted native A Series files and turning them into byte-stream files which can later be burned onto CD-ROM disks. Thus, the software files of a first computer platform, such as the Unisys A Series system, can now be made able to co-exist on the same data CD-ROM's as other types of software which is not A Series software.

KEYSFILES:

The system will provide the use of A Series KEYSFILE which will also be wrapped using the new WFL syntax. This resulting file will also be burned onto the CD-ROM. Normally, the Unisys A Series KEYSFILES are shipped on separate tapes from the rest of the software releases, so that in the present situation, the newly wrapped KEYSFILE will be shipped on a separate data CD-RON separate from the rest of the A Series release software files.

The A Series KEYSFILE is a file on each A Series system used to store License Key information for the individual system in order to determine which of the Unisys licensed features the user has purchased for use on that system.

The new WFL UNWRAP syntax can be used to unwrap the KEYSFILE off of the CD, while copying it into the A Series system. Once the file (as KEYSFILE) has been copied onto the A Series system, then a IK MERGE can be performed. IK MERGE is the system command used to merge the data from the new KEYSFILE (unwrapped from the CD ROM on to Disk) on the A Series system into the system's current KEYSFILE.

DIGITAL SIGNATURE ALGORITHM:

The acronym DSA refers to the digital signal algorithm (DSA). The DSA public and private key are a function of a large prime numbers designated P,Q,G, which are generated by the digital signature algorithm. When "signing" (signaturing) a given file, the DSA requires the values of P,Q,G, and their private key to produce a "digital signature" which consists of two large integers designated R and S. When this message is to be verified, the verification process asks for a set of data designated [P,Q,G, PUBLICKEY, R, S].

A user is only concerned with the public and the private key pair. However, since prime numbers P,Q,G,R,S, are inherent and required in the creation and verification of a "digital signature", there must be provided a way to manage them and make their presence essentially transparent to the user. R and S are easy to handle because they are created during the "signing" process of a WRAP operation, so that their values are readily available to be embedded in the WRAPPED file. The handling of elements P,Q,G, on the other hand, is more complex because their values must be supplied from an "external source", (that is to say, the User), to the WRAPPING function.

Thus questions and decisions arise regarding (i) how should P,Q,G, be generated? (ii) Since the generation process consumes so much resources, how often should P,Q,G, be generated, that is to say, should it be on a per-run basis, on a per-user basis, or otherwise? (iii) Since each binary value occupies an array of 11 words, how would a user handle such large values, since the manual typing of these values would be unnecessarily time-consuming? (iv) Then, what kind of user interface should be provided to accomodate the P,Q,G, public key and private keys? How would they be handled by the Work Flow Language statements of WRAP and UNWRAP? (v) Should the items P,Q,G, be embedded within the WRAPPED FILES? And if so, would that compromise the security of the file, if the file is intercepted when it is transferred across an open network?

The solution to these types of problems and questions will be delineated in the following paragraphs.

OVERALL PROCESS

For each software Release made, a special Release group will run a special utility that generates the values for P,Q,G, public and private keys. This particular set [ID, software level, public key, P,Q,G] will be stored by the utility as a record of the new KEYSFILE called *SYSTEM/DSAKEYSFILE.

The Release group will use the system "private key" during the WRAP process to "sign" all the required system software files for that particular level.

The DSA (Digital Signature Algorithm) KEYSFILE will be distributed to customers in the same manner as the existing SYSTEM/KEYSFILE. Upon receiving the DSAKEYSFILE and the system software, the customer installs the KEYSFILE into the system and starts UNWRAPPING wrapped software without the need for specifying the system public key.

When a user wants to WRAP his files with the digital signature optionm, he must obtain a DSA keypair. Keypairs can be generated by writing a program that calls the MCP, MCP_GENERATEDSAKEYS procedure.

The private key would then be supplied to the WRAPPING routine (for example, through the TASKSTRING attribute of the WFL_WRAP statement). The public key would be given to the receiver of the files. When these files are to be UNWRAPPED, a correct public key must be provided (for example, via the TASKSTRING attribute of the WFL UNWRAP statement) for the operation to succeed.

HANDLING DSA VALUE DURING WRAP AND UNWRAP:

The WRAPPING routine, upon recognizing that a digital signature is required, obtains the P,Q,G, values from the active DSAKEYSFILE for the System Software Release (SSR) level that the system is currently running on. It then provides these values, along with the user-furnished private key, to the DSA "signing routine". This routine, after signaturing the file, returns two large integers, R and S. These two integers, along with the current SSR level, can be stored within the file by the WRAPPING process.

When this file is UNWRAPPED, the UNWRAPPING routine gets P,Q,G, values from the active DSAKEYSFILE based on the SSR level it extracts from the file. The file's R and S values, along with P,Q,G, and the user-supplied public key, are then passed to the DSA signature verification routine. (36y, FIG. 1B). If there is no user-supplied public key (as is often the case of System Software WRAPPED by the Release group), then the system public key from the active DSAKEYSFILE is used.

CHECKSUM:

A checksum is calculated for the Disk File Header (DFH) for every file as it is wrapped. This ensures that there is no unintentional corruption of the Disk File Header as the file is shipped across a network. It also provides the receiver of the file some measure of confidence as to the origin of the file.

In addition to the checksum for the Disk File Header, a checksum is also calculated for the entire context of the file including the Disk File Header (DFH).

SIGNATURE AND CHECKSUM (PREVENTION OF CORRUPTION):

The checksum will not normally be sufficient to ensure that a Disk File Header has not been intentionally corrupted, since the checksum algorithm is not protected and is fairly easy to reproduce. There is significant overhead to validate the Disk File Header if there were no protection of the structure, other than the simple checksum. Thus, without any real protection for the Disk File Header, it would be necessary to create an entirely new Disk File Header for the original file, and then separately validate every attribute of the header before it could be considered trustworthy for application.

The Master Control Program (MCP) 10, FIG. 1B, will assume that a Disk File Header is a valid piece of data.

However, it is necessary to validate the Disk File Header before the rest of the file has even been retrieved, since even the information regarding the size" of the file is stored in the Disk File Header. In order to insure that there was no intentional corruption while the file was in transit and also provide the "receiver" of the file with some assurance that the sender of the file was indeed that who the receiver expected it to be, a "digital signature" may be requested when the file is wrapped by specifying a private key with which to identify the signature file while wrapping. The receiver "must" specify the file's public key in order to verify the file when unwrapping it.

PUBLIC/PRIVATE KEYS FOR SIGNATURING:

A KEYS generation utility is provided as a separate utility to generate public/private key pairs to be used when signing files. Public/Private key pairs are generated using the new utility in order to be used by the wrapping interfaces for signaturing files. Users who wish to create their own utility can write a program to interface with the MCP procedure MCP_GENERATEDSAKEYS.

Figure 2:
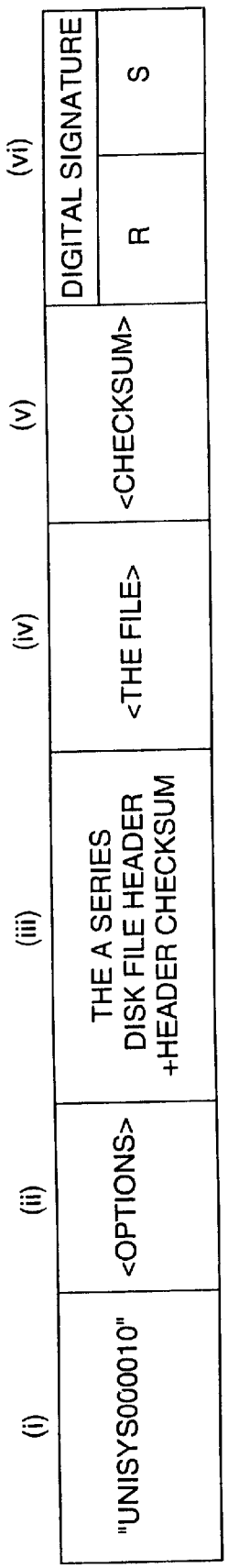
FIG. 2 is an illustration of the format for a container of wrapped data files having signature (R,S) as a byte stream data file.

WRAPPEDDATA FILE FORMAT:

With reference to FIG. 2, there will be seen the format of the WRAPPEDDATA FILE which will be a simple byte-stream file. This file, as seen in FIG. 2, will contain several sections. The first section (i) is the word UNISYS "000010"which will be "EBCDIC" data used to indicate that this is likely to be a Wrapped file. The number associated with this identifier may be changed if the format of this file is changed.

The second block (ii) labeled "options" contains the options used when wrapping the file, such as the identifier to be used to locate the "public key" information in order to verify a file containing a digital signature.

The third block of FIG. 2 is (iii) designated as the Disk File Header, which involves a copy of the actual A Series Disk File Header for the file. This will become the actual Disk File Header for the file when it is restored to its native format after a "unwrap" operation. Additionally in block (iii), there is seen the Header checksum, which is a separate checksum for the Disk File Header itself.

The fourth block (iv) of FIG. 2 indicates "the file" which involves the contents of the file itself, written as byte-stream data.

The fifth block (v) of FIG. 2, is designated as "checksum", which will be a single word of 48 bits calculated for the file and the Disk File Header combined, using a private key from a public/private key pair.

The sixth section (vi) shows the digital signature as being composed of Section R and Section S. The Section R includes 11 words or a total of 528 bits. Likewise, the Section S includes 11 words of a total of 528 bits. This constitutes the digital signature portion of the transmitted file which has been wrapped.

DSAKEYSFILE FILE FORMAT:

The new system involves a keys file called "SYSTEM/DSAKEYSFILE". This file is stored and managed similarly to the manner of existence on earlier A Series systems which used the "SYSTEM/KEYSFILE". This file is used to store records of ID, software level, public key, integers P,Q,G. These involve the following:

(i) ID: This is a unique and meaningful EBCDIC string with a length of up to 17 characters which is used for external display and for identifying the set.

(ii) Software Level: This is a real number that identifies the software level involved, and often designated SSR or System Software Release level.

(iii) Public Key: This is a DSA key generated along with a private key based on certain prime numbers designated P, Q, G. This key is subsequently used in the "Unwrap" process of the A Series software.

(iv) P,O,G: These are prime numbers generated by a special utility. For a given set of (P,Q,G), there are a variety of public and private key pairs which can be generated.

The DSAKEYSFILE is an unblocked file which consists of records whose maximum record size is 60 words in length. The general information record contains miscellaneous data about the file, for example, version, number of search table records, number of key entries, etc. This record is then followed by one or more search table records which in turn, contain a number of four word search entries. Following the search table records are the data records with each containing a different set of [ID, software, public key, P,Q,G].

The main purpose of the DSAKEYSFILE is to store the P,Q,G primes used when creating public and private key pairs. It is also used to store frequently used system public keys which are normally about 60 characters long, so the caller of Unwrap does not need to enter this character string every time an Unwrap process is requested on a Unisys signatured file.

This procedure involves a further procedure entitled "GET_DSA_PQGKEY" which obtains the corresponding set of [P,Q,G, system public key] from the active DSAKEYSFILE and this will involve the procedure entitled "GET_DSA_PQGKEY" which is used to obtain the set of public keys from the DSAKEYSFILE and return the set to the caller.

INTERFACE OPERATIONS:

The present system involves new work flow language (WFL commands) designated as WRAP and UNNRAP which are provided to allow Users a simple method of invoking the new interfaces of this system.

There are two new FILEKIND values created to identify the files of the new format. These will help to prevent users from accidentally using the WRAP syntax to act on a file that has already previously been wrapped.

There is basically now provided two new programmatic interfaces designated as (i) MCP_FILEWRAPPER and also (ii) MCP_WRAPPER. These programmatic interfaces are exported out of the Master Control Program (MCP) 10.

FILEKIND:

This involves a set of values which will aid in identifying files that have been wrapped as long as the files have never left the environment of the first computer system, that is to say, the A Series computer. Once the file has then been copied into a non-A Series system, and then back on to the A Series system, this information is lost. The main purpose of new FILEKIND value is to ensure that a user does not accidentally attempt to WRAP an already WRAPPED file, as would be the case if a WFL WRAP command was executed on a directory of files and then the system did a Halt/Load before all of the files of a directory were wrapped. If the job were to restart after the Halt/Load, the WRAP command would begin to act on the directory over from the very beginning. If a file is encountered with a FILEKIND or with a WRAPPEDDATA value, that file will be skipped, and an error message will be issued for the file indicating that the file had already been previously wrapped.

WORK FLOW LANGUAGE (WFL):

The Work Flow Language syntax is provided to allow a user easy access to the new programmatic interfaces. The new WFL commands permit the user to access the new interfaces to institute a wrap or an unwrap action without having to know the layout of the interfaces or having to create a program to call up these interfaces.

TASKSTRING:

This is a data structure that contains private or public key information for either signaturing or for verifying the signature of the file. Thus, for an "Unwrap" operation, the TASKSTRING will be used to specify the public key that should be used to verify the signature that was calculated when the file was wrapped. Then conversely, for the WRAP operation, the TASKSTRING is used to specify the "private key" that should be used to calculate the signature of the file.

MCP FILEWRAPPER INTERFACE:

The newly developed MCP_FILEWRAPPER program is used for Work Flow Language support and User programs. A User can call this program specifying either a "Wrap" or an "Unwrap" action along with the title and the location of both the input files and the output files. Of course, the input file specified for a "Wrap" operation must not have a FILEKIND of WRAPPEDDATA. Further, the caller must have the proper privilege for both the input and the output files or directories.

The MCP_FILEWRAPPER program involves procedures which return errors. These errors are returned as display messages if the procedure is called from the Work Flow Language (WFL).

MCP WRAPPER INTERFACE:

When this interface program is called to "Wrap" a file, it takes a standard form name for an existing A Series file, along with an output, or Write, procedure. The A Series files Disk File Header (DFH) will be checksum passed the output procedure as data along with the checksum. Then the file itself will be read and passed on to the output procedure as data. Finally, there will be provided (optionally) a calculated digital signature or a checksum for the entire file which will be passed to the output procedure as data.

When the MCP_WRAPPER program copies a file from disk (i.e. "Wraps" the file), it updates the files COPY SOURCE time-stamp in the Disk File Header (DFH) of the A Series file that has been wrapped.

One of the parameters for the MCP_WRAPPER is the procedure designated IOWRAP. IOWRAP is the procedure being passed, either as an output or a WRITE procedure for Wrap or an input or READ procedure for the Unwrap. The parameters for IOWRAP involve (i) LGTH which indicates the length array data in bytes; (ii) DATA is the array containing the data to be written when for wrapping or READ for unwrapping.

It is significant to note that a Disk File Header (DFH) can involve data up to about 20,000 words long. Thus, the IOWRAP parameter procedure must be able to handle at least 20,000 words in the data array in one call.

The basic sequence for unwrapping a wrapped file has been described in the co-pending application U.S. Ser. No. 08/989,738 now U.S. Pat. No. 6,085,266 entitled "System and Method for Unwrapping a Single File from a Compact Disk for Utilization by Various Computer Platforms" and which is incorporated herein by reference.

THE DSA UTILITY:

The Digital Signal Algorithm (DSA) utility has a symbol file designated SYMBOL/DSATOOLS. When compiling this symbol file with the compiler option set at "INTERNAL", a non-restricted version of the utility is produced, otherwise, a restricted version of the utility is produced. This latter version only provides the capability to generate DSA public/private key pairs from a DSAKEYSFILE and is intended for general use.

The symbol file for the DSA Utility provides certain functionalities which include:

(i) the ability to generate key pairs f rom a sequential file containing sets of DSA information.

(ii) the ability to create or to add DSA key sets to a DSAKEYSFILE.

(iii) the ability to delete DSA key sets from a DSAKEYSFILE.

(iv) the ability to dump contents of a DSAIKEYBFILE into a "sequential file" (regular text file).

(v) the ability to merge a DSA3KEYSFILE into the active *SYSTEM/DSAKEYSFILE.

(vi) the ability to copy certain DSA key sets from one DBAKEYBFILE and store them into another KEYSFILE.

Both of the above versions of the code file must be executed under a "privileged" User code.

The restricted version of the DSA utility is designated "OBJECT/DSATOOLS".

A non-restricted version of the DSA utility is designated "OBJECT/DSATOOLS/FULL".

A sequential file containing sets of DSA information is designated, DSAINFO/SOURCE. Currently, this file contains 21 sets of DSA information used to generate system public and private key pairs. Only one set is used per each software release, so that these can last for a considerable period of time.

OVERALL PROCESS:

For each Software Release (SSR = System Software Release), the software origination group will do the following steps:

1. Create a DSAKEYSFILE containing a DSA key set for that release, including a system DSA public/private key pair. The DSA public key is part of the DSA key set. The DSA private key is kept on a secret basis.

2. Using the generated DSA private key, the software origination group will sign Unisys system software. This, however, can be omitted if software is burned into Compact Disks (CD's), since the software on a Compact Disk cannot be tampered with.

3. Distribute the signatured software and the related DSAKEYSFILE to users and customers.

GENERATING A SYSTEM DSA KEY PAIR AND CREATING A DSAREYSILE:

Using a privileged User code, one can execute the following steps:

1. Create a sequential file (for example, DSAINFO442) with at least one of the DSA information sets in the file DSAINFO/SOURCE. Each DSA information set is intended to be used in any one particular Software Release, and the same set should not be used more than once.

For example, in a Command and Edit (CANDE) session, insert the following commands:

MAME DSAINFO/442 SEQ

U ED

]INSERT DSAINFO/SOURCE from line- to line

<editKEYID name if necessary, for example,

SSR442DSAKEYID>

<edit SSR number, if necessary, for example, 442.>

]END

SAVE

Figure 5:
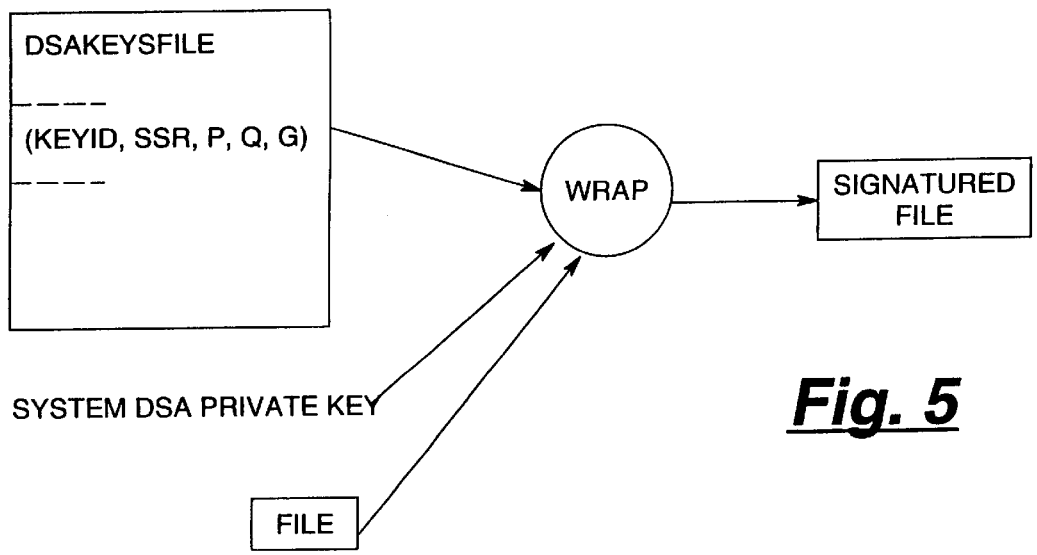
FIG. 5 is a diagram illustrating the Wrapping and Signaturing of a file.

FIG. 5 is a diagram illustrating how the digital signature algorithm information, together with the key ID is inserted into the DSATOOLS, which feeds one Output to the DSAKEYSFILE, and another output to the DSAKEYS/442. This results in the creation of the DSAKEYSFILE, having a public key and a DSAKEYS/442 unit which combines the public key and the private key.

SIGNATURING SYSTEM SOFTWARE USING DSA PRIVATE KEY

1. Assuming that the system is running on a System Software Release designated 44.2, the method is now ready to signature the files. If the system is not ready to signature the files, it is necessary to go back to step 1, in the previous section entitled "OVERALL PROCESS" and create a DSA key set in the *SYSTEM/DSAKEYSFILE for the particular level the system is running on.

2. It is necessary to ensure that SIGNATURESUPPORT is SL-ed. If this is not the case, then SL it with *SYSTEN/DIGITAL/SIGNATURE/SUPPORT. SL is defined in item 39 of the Glossary (System Library 13).

For example, at the Operating Display Terminal (ODT), enter the following:

SL SIGNATURESUPPORT=*SYSTEN/DIGITAL/SIGNATURE/SUPPORT

3. Ensure that DIGESTSUPPORT is SL-ed. If this is not the case, then SL it with:
*SYSTEM/MESSAGE/DIGEST/SUPPORT For example, at the Operator Display Terminal, enter the following:

SL DIGESTSUPPORT=*SYSTEM/MESSAGE/DIGEST/SUPPORT

4. Now, operate to signature the software by using the system DSA private key. Files can be wrapped as separately Wrapped files, or as Containers. The latter, (Containers), allows a number of Wrapped files to be grouped into one single entity. For the software that is to be burned into a Compact Disk (CD), there is no need to signature them since they cannot be altered after they are put into a Compact Disk.

EXAMPLE

Using the WFL WRAP syntax, to pass the system DSA private key in the task attribute TASKSTRING, a Work Flow Language (WFL) job can then be created to automate the wrapping process.

In a Command and Edit (CANDE) session, do the following:

WFL WRAP AFILE AS WRAPPED/AFILE;TASKSTRING=<system DSA private key>

WFL WRAP ADIR/= INTO CONTAINERA; TASKSTRING=<system DSA private key>

It should be noted that the files can also be wrapped and signatured using a programmatic interface to the MCP-exported entry point MCP_FILEWRAPPER.

WRAP AND SIGNATURE FILE:

FIG. 5 is an illustration of wrapping and signaturing a file. Here, it is seen that the wrapping sequence receives information from the DSAKEYSFILE. It also receives an input from the system DSA private key, in addition to receiving the file information, after which the wrapping sequence will produce the signatured file.

5. To make sure that wrapped files are signatured correctly, it is desirable to verify these files before shipping them out to customers over the Internet, or via the CD-ROM.

EXAMPLES UTILIZING THE UNWRAPPED SEQUENCE FOR SYSTEM SOFTWARE THAT WAS SIGNED WITH A SYSTEM DSA PRIVATE KEY

Use the WFL UNWRAP syntax, but do not pass any string in the TASKSTRING attribute. The system will pick-up the corresponding system DSA public key in the file *SYSTEM/DSAKEYSFILE for verification. This step can also be incorporated into the same Work Flow Language (WFL) job that also WRAPS files.

WFL UNWRAP WRAPPED/AFILE AS UNWRAPPED/AFILE

WFL UNWRAP*=AS UNWRAPPED/=OUTOF CONTAINERA

Figure 6:
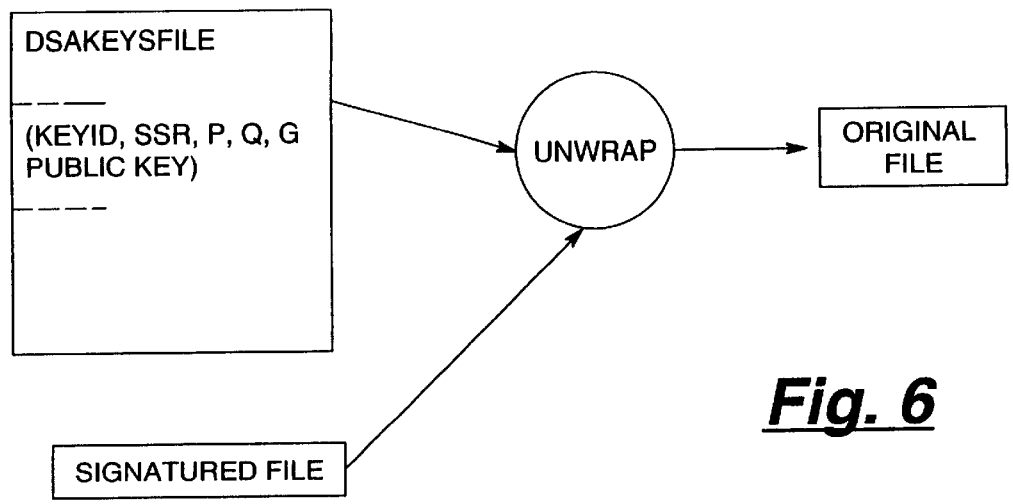
FIG. 6 is a diagram showing the verification and Unwrap of a file.

As seen in FIG. 6, the unwrap sequence is fed information from the DSAKEYSFILE, and also fed by the signatured FILE in order to then produce the original native file which is compatible for the original computer system which uses the Master Control Program.

DISTRIBUTION:

The distribution of the signatured files and the DSAKEYSFILE is done using the ordinary procedures for shipment which can be done via Internet transfer or by CD-ROM.

USING DIGITAL SIGNATURES WITH WRAPPED OR CONTAINER FILES

With the advent of the WRAP/UNWRAP feature, the present system also gives users the ability to optionally sign wrapped or container files with digital signatures. Like a normal signature on a real piece of paper, a digital signature allows the recipient of a signed wrapped file to be certain of its origin. Unlike a normal signature, the digital signature is electronically represented as binary data rather than hand-written characters. This allows the signature to be embedded within the file, and it enables the system to do some special calculations in order to authenticate the signature and verify that the file has not been tampered or altered during its transmission.

Digital signature "creation" is based on the data within a file and a private key. Similarly, digital signature "authentication" is based on the same data of the file and a corresponding public key. The private key and public key are generated as a pair by the system, so even though they are not the same, they still share some underlying common mathematical properties. By differentiating the public key and the private key of a key pair, one cannot use either key for both signing and verification. Thus, a person possessing only a "public key", is capable of uauthenticating a wrapped file's digital signature "created" by a corresponding "private key", but cannot use it to produce the same signature. On the other hand, a person with only the private key will not be able to verify the signed wrapped file. The digital signature algorithm (DSA) also ensures that a public key belonging to one key pair cannot be used to validate the digital signature derived from a private key of another key pair.

Since the DSA is not an encryption algorithm, signing a wrapped file does not scramble its data. Instead the DSA makes a pass through the data stream and applies the specified private key to come up with a checksum-like binary hash pattern which is then inserted into the resulting file.

When creating a wrapped file with digital signature, the originator should perform the following steps:

Obtain a DSA key pair that consists of a public key and a private key

Specify the private key in the wrapping process to create a digitally signed wrapped file Send the signed wrapped file to its intended recipient Send the public key to the same recipient The last two steps should get executed separately to make the file more secure. If both the signed wrapped file and the public key are transmitted in the same message, it may be possible for some unauthorized party to intercept the message, unwrap and modify the file, then sign it with their own private key, and forward, to the unsuspecting recipient, the altered signed wrapped file and a different public key.

Upon receiving a signed wrapped file or container, the recipient of the file should perform the following steps:

Obtain the corresponding public key

Specify the public key in the unwrapping process. If the system does not attempt to authenticate the file's digital signature or fails to do so, the signed wrapped file is either corrupted or was modified and should not be trusted.

The following sections describe in detail what a customer should do to unwrap the signed wrapped files, and how one can wrap and unwrap one's own files with digital signatures.
GETTING STARTED:

New System Libraries: There are two new System Library files that need to be installed and SL'ed (Support Library—Item 40, Glossary) on the system before one can utilize the digital signature feature. These are SYSTEM/DIGITAL/SIGNATURE/SUPPORT and SYSTEM/MESSAGE/DIGEST/SUPPORT. These files are shipped with software releases beginning with HMP NX3.0/SSR44.2. If these files are not currently available on the system, they may be obtained by ordering the SECURITY Interim Correction (IC) for releases beginning with SSR 42.3. From the ODT (Operator Display Terminal), install these files as follows:

SL SIGNATURESUPPORT=*SYSTEM/DIGITAL/SIGNATURE/SUPPORT

SL DIGESTSUPPORT=*SYSTEM/MESSAGE/DIGEST/SUPPORT

NEW DSA KEYSFILE:

A customer also needs to obtain a copy of the SYSTEM/DSAKEYSFILE. This keysfile contains one or more DSA information "sets" where each corresponds to a particular SSR (System Software Release). One can only wrap and unwrap files with digital signatures for the levels indicated in the DSA keysfile. If the *SYSTEM/DSAKEYSFILE already exists on the Halt/Load family, the available levels can be shown by entering the ODT (Operator Display Terminal) command: IK DSASHOW Beginning with HMP NX4.0/SSR45.1, the DSA keysfile is shipped with standard software releases. For earlier releases, a customer needs to call the support organization to obtain a copy of this file. This file will be delivered through the same process as *SYSTEM/KEYSFILE because wrapping the DSA keysfile could compromise Unisys, digital signature s ec urity mec hanism.

The DSA keysfile is cumulative, that is—a DSA keysfile of a later SSR release will contain the DSA information set of that release plus all DSA inf ormation sets of earlier releases [Note: All supporte d software levels earlier than SSR 44.2 will use the 44.2 DSA information set.] Thus, installing a DSA keysfile is as simple as copying the most current DSA keysfile to one's Halt/Load family. However, only the DSA keysfile with the name *SYSTEM/DSAKEYSFILE will be recognized by the sys tem as the active system DSA keysfile. To install a DSA keysfile as the active DA keysfile, the followi ng command is used:

COPY<DSA keysfile filename>AS *SYSTEM/DSAKEYSFILE TO <Halt/Load Pack>(PACK)

SIGNING AND VERIFYING ONE'S OWN FILE

Obtaining one's own Pulic/Private Key Pairs:

In order to add a digital signature to one's own files during the wrapping process, one must first obtain a public/private key pair. Generating key pairs involves writing a program that interfaces with the new KCP procedure MCP_GENERATEDSAKEYS. One may want to use the sample program list ed at the end of this document to help one get the key pairs, or one may want to modify it to suit one's own needs.

Note that key pairs are ge nerated based on an SSR level. This means one cannot use a private key of one SSR level to digitally sign wrapped files for another SSR level.
Creating Digitally Signed Wrapped or Container Files:

Once a key pair is generated, one can use the WFL WRAP syntax to create a digitally signed wrapped file or container file. By passing the private key through the task attribute TASKSTRING of the WRAP statement, one indicates the desire to add a digital signature to the file.

By default, the system will produce the signed wrapped or container file for the current software level.

At times, one may want to create a digitally signed wrapped file for an SSR level different than that of the running system (for example, the recipient of the file may not be on the same SSR level as the operator). For such situations, one will need to specify the targeted SSR level for the WRAP statement through the task attribute TARGET. The level value should be represented as a whole number without the decimal point.

Distributing and Verifying Digitally Signed Wrapped or Container Files:

One can send the signed wrapped or container files to intended users. In order for these files to be verified and unwrapped, one also needs to send the corresponding public key to them. To ensure the wrapped or container files are not compromised in transit, one should avoid sending both signed files and public key at the same time. For instance, if using e-mail as the delivery mechanism, send the public keys in a separate mail message from the wrapped files they are protecting. If files are to be transferred over the Internet, one can allow the wrapped files themselves to be down loaded, but simply display the public key for the recipient to "cut and paste" into the WFL WRAP statement, or offer to send the public key to the recipient via a provided e-mail address.

Recipients of the signed files should use the WFL UNWRAP syntax to verify and unwrap files, passing the public key one provided through TASKSTRING.

DEALING WITH DIGITAL SINGNATURE

One should not release one's private key because it may compromise the signed wrapped or container file's security.

Because both public and private keys are long hex strings, when one needs to execute many WRAP and UNWRAP statements dealing with digital signatures, it may be better for one to create a WFL job and associate the key values with string variables. For instance,
STRING PUBLICKEY,PRIVATEKEY;
PUBLICKEY:="<hex string for DSA public key>";
PRIVATEKEY:ml="hex string for DSA private key>";
WRAP MYDIR/=INTO MYCONTAINER;TASKSTRING=PRIVATEKEY;
UNWRAP=OUTOF YOURCONTAINER;TASKSTRING=PUBLICKEY;

Since wrapping files with digital signatures is processor-intensive, one should generally avoid creating many separate signed wrapped files. One may want to put them into one single signed container instead.

One should not trust files that are supposedly wrapped with digital signatures under conditions when the system does not either attempt to verify the signature or fails to do so.

SAMPLE PROGRAM TO GENERATE DSA KEY PAIRS

BEGIN

This sample program demonstrates the basic technique on how to generate DSA key pairs based on a specified SSR level. The resulting public and private key pairs then can be used in the WFL WRAP/UNWRAP statements to sign and verify signatured wrapped or container files.

```
    FILE DSAKEYS   (KIND=DISK, MAXRECSIZE=14, MINRECSIZE=14,
                    BLOCKSIZE=420, BLOCKSTRUCTURE=FIXED,
FILEKIND=DATA,
                    FRAMESIZE=48, NEWFILE=TRUE);
    LIBRARY MCP (LIBACCESS=BYFUNCTION,
FUNCTIONNAME="MCPSUPPORT.");
    REAL PROCEDURE MCP_GENERATEDSAKEYS (SOFTLEVEL,
NUMOFPAIRS, ARY,
                                                PROC, OPT);
        VALUE    SOFTLEVEL, NUMOFPAIRS, OPT;
        REAL     SOFTLEVEL, NUMOFPAIRS, OPT;
        ARRAY    ARY [0];
        REAL     PROCEDURE PROC (INX, PUBKEY, PRIKEY);
                 VALUE INX;
                 REAL INX;
                 ARRAY PUBKEY, PRIKEY [0]; FORMAL;
        LIBRARY  MCP;
    REAL PROCEDURE WRITEKEYPAIR (PAIRNUM, PUBKEY, PRIKEY);
        VALUE    PAIRNUM;
        REAL     PAIRNUM;
        ARRAY    PUBKEY, PRIKEY[0];
        BEGIN
            ARRAY    BUFF [0:13];
            DEFINE   WRITEIT    =
                     BEGIN
                         WRITE(DSAKEYS, 14, BUFF);
                         REPLACE POINTER(BUFF) BY " " FOR 14
WORDS;
                     END #,
                     WRITEHEXSTR (PREFIX, ARY, INX, LEN) =
                     BEGIN
                         REPLACE POINTER(BUFF) BY PREFIX,
                             POINTER(ARY[INX],4) FOR LEN WITH
HEXTOEBCDIC;
                         WRITEIT;
                     END #;
```

% Notify user about the progress. Useful if USEUSER-PROCF is set.

DISPLAY ("Key pair #"!!STRING(PAIRNUM,*) !!"generated.");

% Keep key pair information secret. Write it out to file.

```
    REPLACE POINTER(BUFF) BY "KEY PAIR #", PAIRNUM FOR
* DIGITS, ":";
    WRITEIT;
    WRITEHEXSTR  ("    PublicKey  = ",   PUBKEY, 0, 48);
    WRITEHEXSTR  ("                ",    PUBKEY, 4, 48);
    WRITEHEXSTR  ("                ",    PUBKEY, 8, 36);
    WRITEHEXSTR  ("    PrivateKey= ",    PRIKEY, 0, 48);
    WRITEHEXSTR  ("                ",    PRIKEY, 4, 48);
    WRITEHEXSTR  ("                ",    PRIKEY, 8, 36);
END;
DEFINE   % Returned value
         CODEF     = [15:08] #,
         SCODEF    = [31:16] #,
         % OPT word
         USEUSERARYF    = [01:01] #,
         USEUSERPROCF   = [00:01] #,
         % Others
         NUMRETKEYS     = KEYARY[0].[15:16] #,
         FIRSTKEY       = KEYARY[0].[31:16] #,
         NUMREQKEYS     = 4 #,          % Number of
requested keypairs
         KEYWORDS       = 11 #,         % Words for
each key
         SSRLEVEL       = 442 #;        % SSR Level
44.2
    REAL     R, I;
    ARRAY    KEYARY [0: (KEYWORDS*2*NUMREQKEYS)],
             PUBKEY [0: (KEYWORDS-1)],
             PRIKEY [0: (KEYWORDS-1)];
```

MAIN PROGRAM

Generate 10 DSA public/private key pairs for SSR level 44.2.

Because both USEUSERARYF and USEUSERPROCF return the same information, one normally sets either flag but not both. This is just an example to illustrate how both cases work.

```
    R := MCP_GENERATEDSAKEYS (SSRLEVEL, NUMREQKEYS,
KEYARY, WRITEKEYPAIR,
                                       0 & 1 USEUSERARYF & 1
USEUSERPROCF);
    IF   BOOLEAN (R) THEN
         DISPLAY ("DSA key generation Error #" !!
STRING(R.CODEF,*) !!
                         " - SubCode #" !! STRING(R.SCODEF,*));
    If USEUSERARYF is set, process the returned info.
        IF (NUMRETKEYS GTR 0) THEN        % Got some good key
pairs
        BEGIN
            FOR I:=1 STEP 1 UNTIL NUMRETKEYS DO
                BEGIN
                    R := ((I-1) * 2 * KEYWORDS) + FIRSTKEY;
                    REPLACE POINTER(PUBKEY) BY
POINTER(KEYARY [R])
                                                  FOR KEYWORDS
WORDS;
                    REPLACE POINTER(PRIKEY) BY
POINTER(KEYARY[R+KEYWORDS])
                                                  FOR KEYWORDS
WORDS;
                    WRITEKEYPAIR (I, PUBKEY, PRIKEY);
                END;
        END;
```

```
        LOCK (DSAKEYS);
END.
```

Figure 3A:
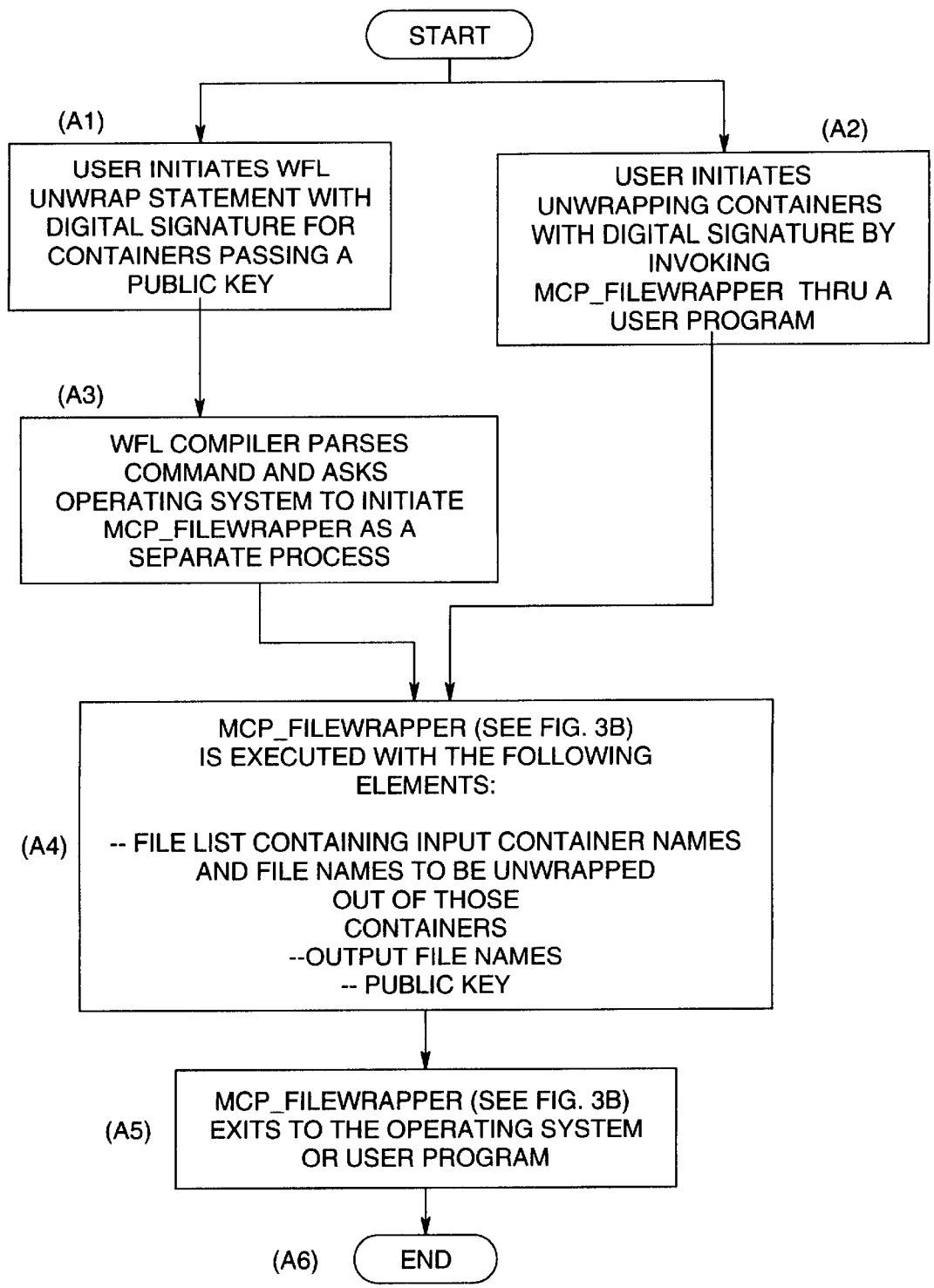
FIG. 3A is a flow chart showing the overall process of verifying and unwrapping files out of containers.

VERIFYING AND UNWRAPPING CONTAINERS:

Referring to FIG. 3A, there is seen the steps involved in the overall process of verifying and unwrapping files out of containers. The sequence is started in one of two alternative ways designated as A1 or A2.

At A1, the User initiates the unwrapping with digital signature by using the WFL (Work Flow Language) unwrap statement for containers and passing a public key.

Alternatively at A2, the User initiates unwrapping containers with digital signature by using a program that calls MCP_FILEWRAPPER through a user program.

At step A3, the WFL (Work Flow Language) compiler 15 parses the command and makes a request to the operating system 14 to initiate the MCP_FILEWRAPPER routine 36 as a separate process.

At step A4, the MCP_FILEWRAPPER Routine 36 is executed (as per FIG. 3B), with the following elements:— the file list containing the Input and Output file container names and the file names to be unwrapped out of the containers, the public key.

At step A5, the MCP_FILEWRAPPER routine, (illustrated in FIG. 33), exits to the Operating System 10 of platform 14, or a User program in operator terminal 8.

At step A6, this ends the sequence.

The sequential steps involved in the MCP_FILEWRAPPER routine 36 is shown in FIG. 3B hereinunder.

In order to digitally verify and unwrap files out of a container, there is a sequence of steps within the MCP_FILEWRAPPER routine which is illustrated in FIG. 3B.

Referring to FIG. 3B, at step B1 the MCP_FILEWRAPPER program 36 is initiated in the Master Control Program 10 of FIG. 1B.

At step B2, substep (a), all parameters are verified, then at (b) verification is made of the User-specified public key's hexadecimal presentation, and then at (c) a check is made to see if the source medium is a CD-ROM or a disk.

At step B3, a decision tree is used to question whether the container has a name. If the answer is "NO", then at step B8, if there is something in the internal processing list, the sequence will call the EXTRACTLIST program (of FIG. 3C) to process it, after which at step B9, there will be an exit of the routine MCP_FILEWRAPPER.

At step B3, if there is a container name "YES", then at step B4 the container will be opened and a verification of its validity will be developed.

At step B5, a question/decision tree will determine if there is a file name or a directory name to be unwrapped out of this container. If the answer is "NO", then at step B7 there will be a closure of the container file.

At step B5, if the answer is "YES", that is to say, there is a file name or a directory name to be unwrapped out of the container, then step B6 is invoked with its several substeps.

At step B6, substep (a), if there is a directory name, a check is made to see if the user is privileged to access it.

At step B6, (b), a check is made to see if the container's directory contains the specified file name or file names that match with the specified directory.

At substep (c), if the container name has not been added to the internal processing list, then it will be added into the processing list.

At substep (d), the added matched file names found in the container's directory are added to the internal processing list.

Then at step B7, there is a closure of the container file.

FIG. 3C is an illustration of the sequential steps for the EXTRACTLIST Logic to digitally verify and unwrap files out of the containers.

At step Cl, there is an entrance to the routine designated EXTRACTLIST which is initiated by MCP_FILEWRAPPER program 36.

At step C2, the sequence will get the next container name from the internal processing list if there is one. If this is a "NO", then at step C10, there is an exiting of the routine EXTRACTLIST.

At step C2, if there is a next container name "YES", then step C3 is invoked which has substep (a) to open the container file and substep (b) to call the SIGNATURE_VERIFIED logic (of FIG. 3D) in order to verify the container's digital signature.

At step C4, a decision block is entered to question as to whether the container's signature is verified(?). If "NO", then at step C9, there is a closure of the container file and a return to step C2.

At step C4, if the container's signature is verified "YES", then at step C5, another decision block iis encountered to determine whether there is a file name (in the internal processing list) to be unwrapped for this container. If the answer is "NO", then at step C9, there is a closure of the container file.

At step C5, if the answer is "YES", that is to say, there is a file name to be unwrapped for this container, then the sequence proceeds to step C6.

At step C6, the program will get a file name to be unwrapped, also get its address in the container file and get its new destination file name.

At step C7, there is a positioning of the container's file pointer to the beginning of the file to be unwrapped, as indicated by the address.

At step C8, there is a calling of the program routine designated MCP_WRAPPER (as per FIG. 3E) in order to unwrap the file and passing its new destination file name together with a Read routine.

Then step C8 will loop back to step CS after which the sequence will close the container file at step C9 and return to step C2 and then exit the EXTRACTLIST program at step C10.

FIG. 3D is a flow chart illustrating the routine designated SIGNATURE_VERIFIED logic to digitally verify a wrapped container;

Referring to FIG. 3D, at step V1, the routine is entered for a SIGNATURE_VERIFIED sequence;

At step V2, a check is made to see if this version of the container supports a digital signature;

At step V3, a decision block is used to determine if the file has a digital signature;

At V3, if there is no digital signature, then step V11 occurs to exit the SIGNATURE_VERIFIED routine with a GOOD_SIGNATURE result;

At step V3, if the file does have a digital signature (YES), then step V4 occurs in a series of functional substeps (a) through (e);

At step V4a, a link is made to the Signature Support Library 13 in order to use its DSAVERIFY routine;.

Then at step V4b, the sequence will obtain the SSR level of the wrapped file; (SSR is the System Software Release).

Then at step V4c, a call will be made to the routine designated GET_DSA_PQGKEY in order to obtain the prime numbers P,Q,G and also the system public key which is based on the SSR level;

Then at step V4d, the public key variable is set to the User-specified key, if there is one—otherwise, it is set to the system public key;

At step v4e, then the sequence will make the first DSAVERIFY call for the ID string source company name which in this case, is designated as "Unisys";

At step V5, data is read from the container file into a local buffer, such as memory 18;

At step V6, a decision block occurs as to whether there is more data to come. If there is no more data to come (NO), then step V8 will Read the R & S signatures and proceed to step V9; if "YES" at V6 then step V7 calls the DSAVERIFY procedure for data in the local buffer which then loops through V5 and V6.

At step V9, there is a final call to the DSAVERIFY routine passing the parameters P,Q,G,R,S and a variable public key over to step V10;

At step V10, a decision block occurs as to whether it is a good digital signature. If the answer is (YES), then procedure goes to step V11 where there is an exit of the Signature-Verified routine with a Good_Signature result;

At step V10, if it was not a good digital signature, (NO) the procedure then moves to step V12, where an exit is made of the SIGNATURE_VERIFIED routine with a RAE_SIGNATURE result.

Figure 3E:
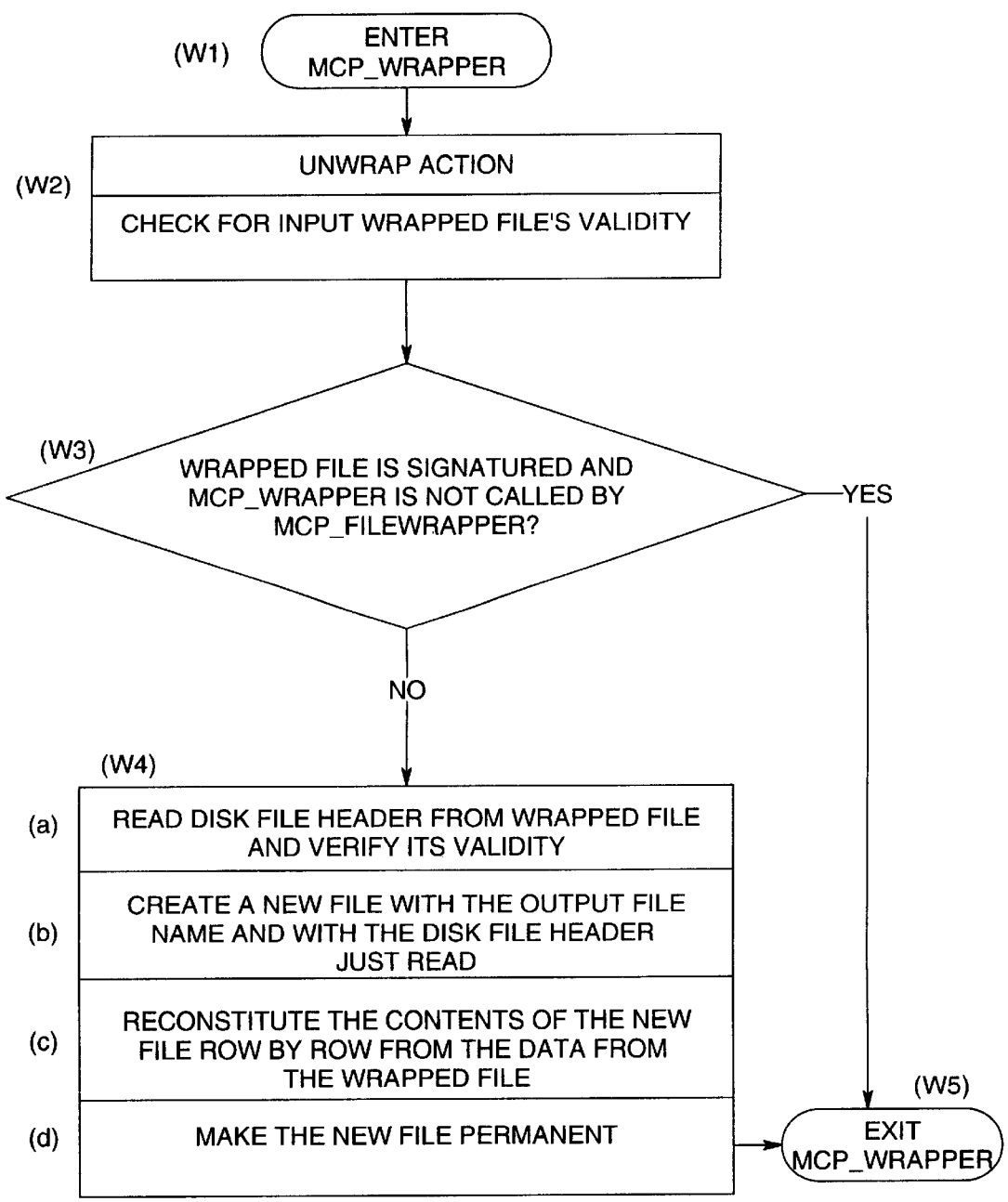
FIG. 3E is a flow chart illustrating the program for MCP-WRAPPER's generalized logic for unwrapping a single wrapped file.
Figure 4:
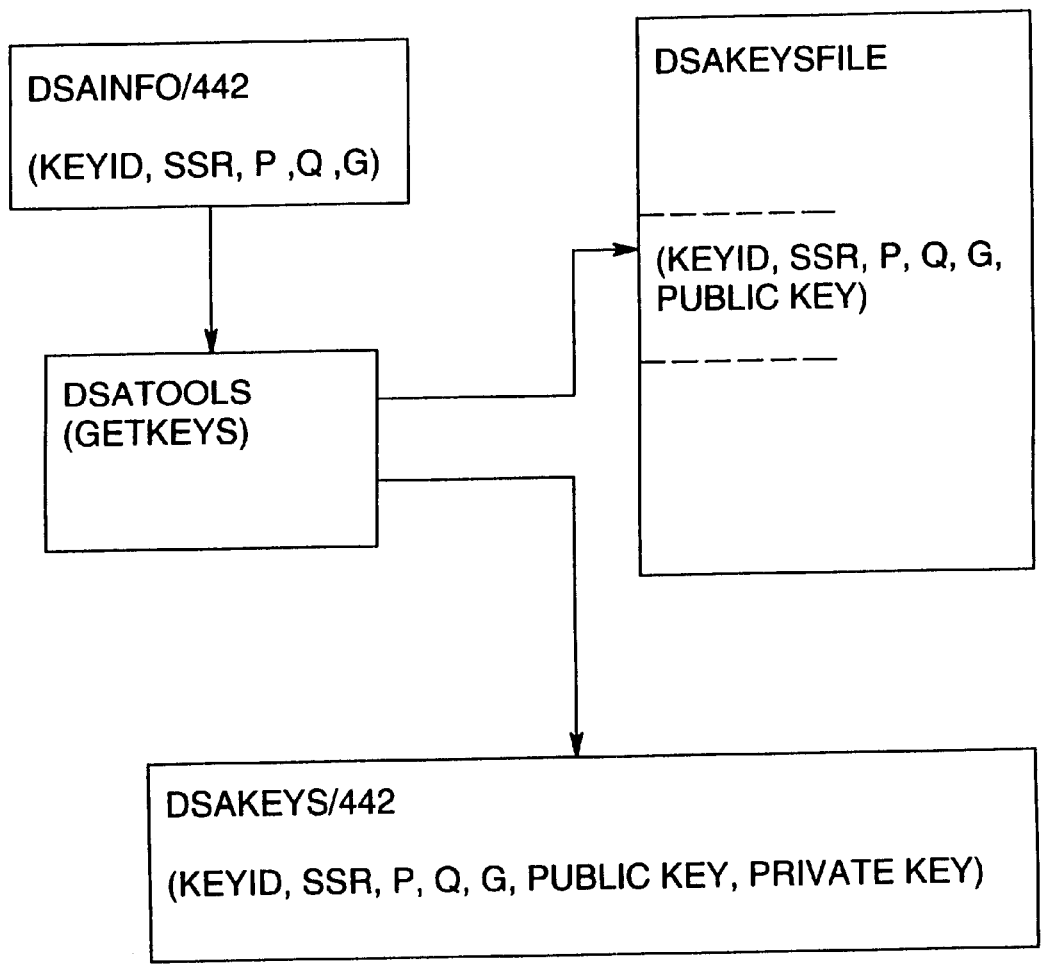
FIG. 4 is a diagram showing the creation of DSAKEYSFILE.

FIG. 3E illustrates the sequential steps involved in the MCP_WRAPPER logic 38 to unwrap a wrapped file out of a container.

Referring to FIG. 3E, the initiation at step W1 involves the entering of the MCP_WRAPPER routine.

At step W2, the unwrap action is initiated and a check is made for the Input wrapped file's validity.

At step W3, a decision block is involved where the wrapped file is signatured and the routine NCP_WRAPPER is not called by the MCP_FILEWRAPPER program.

At step W3, if the NCP_WRAPPER is "not called" (YES), then step W5 indicates an exit of the MCP_WRAPPER routine.

If the MCP_WRAPPER is called (NO), then step W4 indicates a series of substep operations, where W4a shows the sequence of reading the Disk File Header from the Wrapped file in order to verify its validity;

Then at step W4b, there is created a new file with the Output file name and with the Disk File Header which had just been read;

Then at step W4c, there is a reconstitution of the contents of the new file, row by row, from the data from the wrapped file;

Then at step W4d, the new file is made as a permanent file, after which the sequence goes to step W5 to exit the MCP_WRAPPER routine.

Described herein has been a method and system whereby standardized byte stream data files consisting of a container having multiple files and directory which are utilizable for transfer over the Internet, or usable for many types of platforms such as the NT and UNIX platforms, can subsequently be "unwrapped" and re-converted back into their native specialized format, including all their attributes which are suitable for working with a specialized proprietary computer system. A major function of the unwrapping process described herein has been the use of signatures which have been developed to add into the container's data file so that the signature can be checked so as to verify the integrity of the data file. Thus, the unwrapped data file will have a signature of two sets of multiple words designated R and S, which can be checked in order to verify the integrity of the reconstituted native specialized proprietary file after being transformed from a byte stream industry-standard data file.

While other variations and embodiments of the described method may be implemented for various purposes, the invention is defined by the following claims appended herein.

What is claimed is:

1. A method for verifying and unwrapping a signatured wrapped container file comprising the steps of:

(a) establishing a DSA KEYSFILE which holds parameters of KeyID, SSR, P, Q, G and a system public key;

(b) establishing signatured words R and S for the container file which is wrapped and exists as an industry-standard byte stream text format file;

(c) utilizing an Unwrap operation which accesses said parameters of said DSA FILE and which accesses said signatured container file with said R and S words;

(d) executing an Unwrap operation to the parameters and signatured container file in order to restore files in the reconstituted specialized original native file format.

2. In a network having a first computer platform which utilizes specialized original native format file and a second platform which uses an industry-standard byte stream text data format container file with digital signature, as a standard file, a method for converting and reconstituting said industry-standard byte stream text container data file into specialized original native format files which are unwrapped and useable by said first computer platform comprising the steps of:

(a) accessing said industry-standard byte stream container data file with digital signature from an open network by transmission to said second platform;

(b) storing, by said second platform of said accessed industry-standard byte stream container data file and signature;

(c) receiving and processing by said first platform of said byte stream container data file (wrapped file) including:

(c1) verifying the signature of said wrapped container data file in order to validate the integrity of the transmitted file;

(c2) processing said wrapped byte stream container data file by said first computer platform using its own operating system and programs to convert said wrapped industry-standard byte stream container data file into unwrapped specialized original native files;

(d) placing said unwrapped files after verification onto a storage medium usable by said first computer platform.

3. The method of claim 2 wherein step (c1) includes the step of:

(c1a) calling a first program routine (MCP_FILEWRAPPER) which utilizes a special verification routine (DSAVERIFY) from a Signature Support Library to validate the integrity of the transmitted byte stream container data file.

4. The method of claim 2 wherein step (c2) includes the step of:

(c2a) executing a second program routine (MCP_WRAPPER), after signature verification, to convert (unwrap) said byte stream container data file into said original specialized native data files.

5. In a computer platform operating on a specialized original native format container data file, a method for converting an industry-standard byte stream data container file with signature back to said original specialized native format data files comprising the steps of:

(a) initiating an unwrap operation on said byte stream container data file with digital signature including entering a public key by a user;

(b) executing a MCP_FILEWRAPPER routine to verify the user specified public key and to verify the container file's signature;

(c) calling a MCP_WRAPPER program to unwrap the verified container file in order to reconstitute the accessed byte stream signature and data files within the container into the original specialized native format data files.

6. The method of claim 5 wherein step (b) for signature verification includes the steps of:

(bi) checking for validity of the wrapped container file;

(bii) checking to see the container file has a digital signature;

(biii) calling a Signature Support Library to use a verification routine which then reads the digital signature;

(biv) verifying that the signature is the proper value.

7. The method of claim 6 where step (biii) includes the steps of:

(a) obtaining the System Software Release (SSR) level of the wrapped container file;

(b) calling the routine GET_DSA_PQGKEY in order to obtain the prime numbers P,Q,G and the system public key which is based on the System Software Release (SSR) level;

(c) reading the data from the signed wrapped container file to a local buffer and calling the program DSAVERIFY to verify signature words (R,S) where R and S are a series of digital words.

8. In a computer platform utilizing a Signature Support Library, and operating on a specialized original native format container data file and disk File Header (DFH), a system for receiving and utilizing an industry-standard byte stream data files having a digital signature in order to decode and reconstitute said byte stream container data file into said specialized original native format container data file after execution of a signature integrity verification program, said system comprising:

(a) means for accessing said industry-standard byte stream container data file and signature;

(b) means to verify said digital signature portion of said reconstituted byte stream container file in order to verify the integrity of said container file;

(c) program means to reconvert said accessed byte stream container data file into resultant files of said specialized original native files after signature verification;

(d) means to place said resultant verified files on a storage medium for use by said computer platform.

9. The system of claim 8 wherein said means to verify said digital signature includes:

(a) first program means (MCP_FILEWRAPPER) to access said Signature Support Library;

(b) said Signature Support Library for calling a verification routine (DSAVERIFY) which validates said signature;

(c) second program means (MCP_WRAPPER) for converting, after signature verification, said byte steam container data file into verified specialized original native files.

10. In a first computer platform operating on a specialized original native formatted files, a system for verifying and unwrapping a wrapped byte stream container data file into said original specialized native formatted files, comprising:

(a) means to access a signatured byte stream text container data file;

(b) means to access a Digital Signal Algorithm (DSA) Keysfile holding a set of specialized parameters and system public key;

(c) means to combine said DSA Keysfile with said signatured byte stream text container data file to verify said container data file's integrity;

(d) means to execute an Unwrap operation on said verified container data file in order to reconstruct said specialized original native files after verification of said signature.

11. The system of claim 10 where said set of specialized parameters include:

(i) a KEYID;

(ii) a System Software Release level (SSR);

(iii) a random group of prime numbers designated P,Q,G.

12. A method for verifying and unwrapping a signatured wrapped container file comprising the steps of:

(a) initiating by a user of a Work Flow Language (WFL) Unwrap statement with digital signature for a container including passing a public key to a signature support library;

(b) parsing the unwrap statement command via a Work Flow Language compiler and instructing the Master Control Program Operating System to initiate the procedure MCP_FILEWRAPPER;

(c) executing the procedure MCP_FILEWRAPPER on a file list containing input container names and the file names to be unwrapped out of these containers and utilizing the public key which was passed to said Operating System;

(d) verifying the user-specified public keys;

(e) identifying a container name and opening the container to verify its validity;

(f) unwrapping a file name and/or a directory name for unwrapping out of the container;

(g) checking each directory name to see if the user is privileged to access it;

(h) sorting and checking to see if a particular container's directory contains the specified file name or names that match the specified directory;

(i) adding to the internal processing list any matched file names which are found in the container's directory;

(j) closing the container file.

13. The method of claim 12 wherein step (e) "Got a Container Name?" includes the steps of:

(i) calling the EXTRACTLIST program for processing if there is no container name, but there is something in the internal processing list;

(ii) executing the EXTRACTLIST program in order to:

(c1) get the next container name from the internal processing list;

(c2) open the container file and calling the SIGNATURE_VERIFIED logic to verify the container's digital signature;

(c3) check to see that the container's signature is verified;

(c4) check to see if there is a file name in the internal processing list to be unwrapped for this container;

(c5) get the file's name for unwrapping, getting its address in the container file and its new destination file name;

(c6) positioning the container's file pointer to the beginning of the file to be unwrapped as indicated by the file's address;

(c7) executing the procedure MCP_WRAPPER in order to unwrap the passing file and giving it its new destination file name.

14. The method of claim 13 wherein step (c2) of the SIGNATURE_VERIFIED logic includes the steps of:

(a) initiating the signature verified logic;

(b) checking if the container supports a digital signature;

(c) seeing that the file has a digital signature;

(d) communicate with the signature support library to use its DSA Verify routine;

(e) read data from the wrapped file into a local buffer;
(f) read the R & S signatures;
(g) call the DSA verify routine by passing the parameters P,Q,G,R,S and the public key;
(h) validating the signature as a good digital signature.

15. The method of claim 13 wherein step C7 on executing the MCP_WRAPPER procedure includes the steps of:

(a) initiating an unwrap action and checking for the input wrapped file's validity;
(b) determining whether the wrapped file is signatured and there are no further calls by the MCP_FILEWRAPPER to the MCP_WRAPPER;
(c) exiting from the MCP_WRAPPER procedure.

* * * * *